(12) United States Patent
Tibazarwa

(10) Patent No.: US 7,254,805 B2
(45) Date of Patent: Aug. 7, 2007

(54) REQUIREMENT-CENTRIC EXTENSIBLE MULTILINGUAL INSTRUCTION LANGUAGE WITH ANTI-TASK ACTIONS FOR COMPUTER PROGRAMMING

(76) Inventor: Augustine Tibazarwa, 816 Willard St., Apt. #313, Quincy, MA (US) 02169

( * ) Notice: Subject to any disclaimer, the term of this patent is extended or adjusted under 35 U.S.C. 154(b) by 762 days.

(21) Appl. No.: 10/378,299

(22) Filed: Mar. 3, 2003

(65) Prior Publication Data

US 2004/0181778 A1  Sep. 16, 2004

(51) Int. Cl.
*G06F 9/44* (2006.01)
(52) U.S. Cl. ............................ 717/100; 715/536; 704/8
(58) Field of Classification Search ................ 717/100; 715/536; 704/8, 9
See application file for complete search history.

(56) References Cited

U.S. PATENT DOCUMENTS

| | | | | |
|---|---|---|---|---|
| 6,182,279 | B1 * | 1/2001 | Buxton ........................ | 717/100 |
| 6,748,353 | B1 * | 6/2004 | Iliff ............................... | 704/9 |
| 6,944,846 | B2 * | 9/2005 | Ryzhov ....................... | 717/116 |
| 7,127,700 | B2 * | 10/2006 | Large .......................... | 717/100 |

OTHER PUBLICATIONS

Template Software SNAP Foundation Template Using the SNAP Development Environment (SNAP), whole manual, copyright 1998, released 1997.*
Template Software SNAP Foundation Template Using the SNAP Permanent Storage Component (PERM), whole manual, copyright 1998, released 1997.*
Template Software SNAP Foundation Template Using the SNAP Communication Component (COM), whole manual, copyright 1998, released 1997.*
Template Software Foundation Template SNAP Application Developer's Training Course, (TRAINS) Module1 and 10, 1997.*
Template Workflow Template Process Foundation, Using the WFT Development Environment (ENV) Whole Manual, copy right 1998.*
Template Workflow Template Process Foundation, Developing a WFT System (WFT) Whole Manual, copy right 1998.*
Workflow Template Training Course Version 8.0 Section A, 1997.*
Forte Release 2, Building International Applications, 1995, Whole Manual.*
Forte, Forte Programming Guide , Release 3, Chapter 15, 1998.*
Adele Goldberg "Support for Object-Oriented Programming" in Concepts of Programming Languages, by Robert W. Sebesta,1999, pp. 437-485, Addison-Wesley.

* cited by examiner

*Primary Examiner*—Todd Ingberg
(74) *Attorney, Agent, or Firm*—AKC Patents LLC; Aliki K. Collins

(57) ABSTRACT

A computer programming system for multilingual scripting and executing an application program includes a processor, an object oriented programming language system, and a memory. The object oriented programming language system includes a multilingual scripting program for composing code written in a text file according to an object oriented programming grammar. The multilingual scripting program includes a small number of basic keywords defining one or more task actions, one or more anti-task actions terminating the actions of the corresponding one or more tasks, one or more objects and one or more object properties. The programming language system also includes a parser program for converting the code written in the text file into one or more executable task actions, one or more executable anti-task actions and one or more properties of one or more objects, and an execution engine for executing the one or more task actions and the one or more anti-task actions upon the one or more properties of one or more objects.

98 Claims, 17 Drawing Sheets

611
```
nombre entrée ( vide )
{
    alphanumerique nom  = "John";

montrer("Hello World!" );
    montrer("My name is %s\n", nom );

retour(1);
};
```

612
```
namba mlango ( tupu )
{
    maneno  jina  = "John";

chapisha ("Hello World!" );
    chapisha("My name is %s\n", jina );

rudisha (1);
};
```

613
```
int main (void )
{
    char* name  = "John";

printf("Hello World!" );
    printf("My name is %s\n", name   );

return (1);
};
```

610
```
#define nom  name
define naam name define nombre int
define namba  int define vide void
define tupu void define alphanumerique char*
define maneno char* define montrer printf
define chapisha printf define entrée main
define mlango main define retour return
define rudisha return
```

*FIG. 10 (Prior Art)*

REQUIREMENT-CENTRIC EXTENSIBLE MULTILINGUAL INSTRUCTION LANGUAGE WITH ANTI-TASK ACTIONS FOR COMPUTER PROGRAMMING

FIELD OF THE INVENTION

The present invention relates to a system and a method for computer programming, and more particularly to a Requirement-centric Extensible Multilingual Instruction (Remi) language for computer programming.

BACKGROUND OF THE INVENTION

A typical programming system includes hardware and software components. Hardware components are computing devices and include personal computers (PC), mainframe computers, and computing circuits, among others. The basic architecture of a computing device includes a central processing unit (CPU) which actually executes instructions and a memory unit which stores instructions and data. Instructions and data are transmitted from the memory unit to the CPU and the results of the CPU operations are sent back to the memory unit. Software components are applications programs, which contain the set of instructions that are executed by the CPU unit. The applications programs include, system programming software, word processing software, spreadsheet evaluation software, drawing software, mathematical and other scientific software, among others. The majority of computer users regard a programming system as a computing tool to perform simple or complicated tasks. Typically a user defines a problem statement and/or an objective and sets out to solve the problem and accomplish his objective by carrying out one or more tasks with the computing tool. Each interaction of the user with the computing tool defines a Task Action and is an active step towards solving the stated problem and accomplishing the objective. The objects of the Task Action are called Task Action Objects. After each interaction the user decides on the next interaction based on the result of the previous interaction and the next desirable interaction to accomplish the set objective. This process of solving a defined problem is captured in the set of instructions that are contained in the application program. A computer programmer scripts the set of instructions in a source file using the grammar rules of a programming language. In the example of FIG. 1 a programmer scripts the source file using the grammar and syntax of the JAVA™ programming language 82. The JAVA™ scripted file passes through a JAVA™ compiler 84 where it gets analyzed and parsed. The parsed file is used to generate a JAVA™ bytecode, i.e., a code that is readable by a JAVA™ virtual machine. The JAVA™ bytecode is executed by the JAVA™ virtual machine 86. JAVA™ is an object-oriented programming language. In an object-oriented programming language computation on a data object is specified by calling subprograms associated with the data object. Object-oriented application programs typically model a problem domain using an "object model" that defines classes of objects representing elements of the problem domain. A class definition defines the class in terms of the relationship of the class to other classes, the data associated with objects in the class, the operations that can be performed on objects in the class. During execution of an object-oriented application program, instances of the classes in the object model, referred to as "objects," are produced and manipulated. Object-oriented programming languages are well known in the art and are described in "Programming languages" Chapter 11, p 435-483, edited by Robert W. Sebesta.

The development of an application program is a complicated process. This complication is a result of the large variety and complexity of the programming languages, data types, hardware types, operating system types, and program auditing techniques, among others. Software programmers are usually highly trained software engineers with many years of practical experience. Programming overall is an expensive operation. Attempts have been made to make programming languages more interpretive, so that they can be easily learned and used by programmers with no background or interest in professional software engineering or software development. However, these interpretive languages have very limited performance and have not gained acceptance in the industry. Characteristics of a "good" programming language include readability, writability and reliability. Readability is the ease with which a program can be read and understood. Writability is a measure of how easily a language can be used to create programs in a chosen domain, and a program is said to be reliable if it performs to its specifications under all conditions. Readability and writability depend upon the overall simplicity and orthogonality of the language. Simplicity requires a small number of basic components and orthogonality means that a relatively small number of primitive constructs can be combined in a relatively small number of ways to build control and data structures of the language. Adequate facilities for defining data types and structures are another aid to readability and writability. Furthermore, the syntax, or form of the basic elements of the language needs to be easily recognizable and unambiguous. Writability also depends upon abstraction and expressivity of the language. Abstraction means the ability to define and then use new and complicated structures and operations in ways that allow many details to be ignored. Expressivity refers to having powerful operators that allow a great deal of computation to be accomplished with a very small program. Reliability depends primarily upon error checking during the compiling and execution of the program and the ability to handle exceptions, i.e. the ability of a program to intercept run-time errors and to take corrective actions.

The worldwide proliferation of software tools and software applications, and the increased worldwide awareness of the versatility and problem-solving capabilities of those software tools and software applications, have led to an emerging need to be able to write software programs using words and instructions that are not limited to one spoken language. A related problem that has emerged with the worldwide marketing expansion of software programming is the need to translate software programs from their original language into the spoken language of the specific user or location where the program is used. Many software programs are developed using a programming language comprising words and instructions based in one spoken language, usually English. Although some of these programs may be written to produce messages and information in any language of choice, the logic and algorithms in those programs is usually only expressed in one language, for the most part, in English. Translating the logic and algorithms into other spoken languages for worldwide distribution is a time consuming and expensive endeavor that requires a lot of labor. In addition to the added cost, mistakes often occur during the translation of the software. These translation mistakes could result in misunderstanding of the original logic and algorithms and the translated program could perform differently than originally intended.

Accordingly, there is a need for an intuitive programming language that is suitable for multilingual programming and can be used by any programmer who can read and write in at least one spoken language. The programming language needs to be simple, but flexible enough to be used to script complicated programs, orthogonal, reliable, able to handle exceptions, easily expandable in terms of new constructs and new languages, and able to support multilingual programming without the need to recompile the original program.

SUMMARY OF THE INVENTION

In general, in one aspect, the invention features a computer programming system for scripting and executing one or more applications programs. The computer programming system includes a processor, an object oriented programming language system, a viewing program, and a memory. The processor executes the one or more applications programs under the control of an operating system. The memory is associated with the processor and stores the operating system, the object oriented programming language system, the viewing program, and the one or more applications programs. The object oriented programming language system includes a scripting program for composing code written in a text file according to an object oriented programming grammar, a parser program for converting the code written in the text file into one or more executable task actions and one or more properties of one or more objects, and an execution engine for executing the one or more task actions upon the one or more properties of the one or more objects. The viewing program provides viewing of the instantaneous results and progress of the execution engine on the one or more task actions and the one or more properties of the one or more objects.

Implementations of this aspect of the invention may include one or more of the following features. The object oriented programming grammar comprises at least five predefined task actions, including "remember" for granting a lasting effect, "find" for performing a search, "present" for creating an output file, "serve" for executing a specialized service, and "end" for terminating a service. The object oriented programming grammar further comprises at least four predefined anti-task actions, including "remember-not", "find-not", "present-not", and "serve-not". The anti-task actions terminate and cancel the corresponding task actions. The object oriented programming grammar further comprises at least six predefined object types, including "service" referencing a specialized set of task actions, "variable" representing a value, "class" representing a set of properties and services encapsulated by an object, "operator" referencing a resulting outcome of a set of task actions and operations, "label" referencing a character string of an object name, and "exhibit" referencing an object used to create an output file. The object oriented programming grammar also comprises at least one predefined assertion instruction, including "is" and at least two conjunctive keywords, including "by" and "with". The multilingual object-oriented grammar comprises keywords that can be expressed in any language, including, but not limited to, English, French and Swahili. The multilingual object oriented programming grammar further comprises optional programming of one or more user-defined task actions, one or more user-defined anti-task actions, one or more user-defined objects, and one or more user-defined object properties, all of which can be expressed in any language, including but not limited to English, French and Swahili. The user-defined anti-task actions terminate corresponding user-defined task actions. The object oriented programming grammar further comprises one or more constraints and invariants associated with each of the one or more task actions and adapted to be applied to each of the one or more task actions. The execution engine executes and applies the one or more constraints and invariants to each of the one or more task actions. The object oriented programming grammar further comprises one or more object property constraints and integrity checking services associated with a defined property of each of the one or more objects and adapted to be applied to the defined property of each of the one or more objects. The execution engine executes and applies the one or more object property constraints and integrity checking services to the defined property of each of the one or more objects. The object oriented programming grammar further comprises one or more object structural constraints and integrity checking services associated with a defined property of each of the objects and adapted to be applied to each of the defined properties of each of the objects. The execution engine executes and applies the one or more object structural constraints and integrity checking services to each of the defined properties of each of the objects. The one or more structural constraints and integrity services associated with a defined property of each of the objects may comprise setting one or more property values for the defined property of each of the objects, setting one or more constants for the defined property of each of the objects, or executing one or more property services for the defined property of each of the objects. The object oriented programming grammar further comprises programming one or more environmental constraints and integrity checking services associated with a defined property of each of the objects and adapted to be applied to the defined property of each of the objects. The one or more environmental constraints and integrity checking services comprise setting one or more external objects, or setting one or more external properties. The execution engine executes and applies the one or more environmental constraints and integrity checking services to the defined property of each of the objects. The execution engine may execute and apply synergistically the one or more property constraints and integrity checking services, the one or more structural constraints and integrity checking services, and the one or more environmental constraints and integrity checking services to each defined object property. The object oriented programming grammar further comprises programming one or more constraints and invariants associated with each of the one or more task actions and adapted to be applied to each of the one or more task actions. The execution engine executes and applies synergistically the one or more constraints and invariants associated with each of the one or more task actions, the one or more property constraints and integrity checking services, the one or more structural constraints and integrity checking services, and the one or more environmental constraints and integrity checking services to each defined object property. The object oriented programming grammar further comprises programming any of the task actions, objects, and object properties, listed in Table 21. The object oriented programming grammar comprises one or more attempted assignments and one or more mandatory assignments for each object, variable and object property. The one or more attempted and mandatory assignments are adapted to be executed by the execution engine. The execution engine executes the one or more attempted and mandatory assignments for each object, variable and object property and further marks each of the successful assignments as successful assignments and each of the unsuccessful assignments as unsuccessful assignments. The execution engine executes and applies an integrity checking service to each object, variable and object property whenever the object, variable and object property are an operand. The one or more object properties comprise value-centric properties selected from a group including numerical values, alphanumerical values and combinations thereof. The one or more object properties comprise service-centric properties selected from a group including a service, a constraint and an invariant. The object oriented programming grammar further comprises one or more operators or user-defined operators. The operators or user-defined operators are selected from a group including unary left-associated operators, unary right-associated operators, binary operators, and alphanumerical binary operators. The object oriented programming grammar further comprises one or more translations of the task actions, the anti-task actions, the object types, the assertion instruction and the conjunctive keywords, in one or more human or non-human languages, respectively. The object oriented programming grammar further comprises one or more translations of user-defined task actions, user-defined objects, user-defined object properties, and user-defined operators in one or more human or non-human languages, respectively. The one or more human are selected from a group including English, French, Swahili, Dutch, German, Spanish, and Italian. The one or more non-human languages are selected from a group including machine languages and other programming languages. The text file is adapted to be scripted using any combination of the one or more translations of the task actions, the anti-task actions, the object types, the assertion instruction and the conjunctive keywords. The viewing program includes a visual textual display, displaying the executable task actions and objects. The viewing program further comprises one or more visual textual displays, displaying translations of the executable task actions and objects in one or more human or non-human languages. The visual textual displays are adapted to be viewed simultaneously and in real-time by one or more viewers, located in one or more separated locations, respectively, in one or more human or non-human languages, respectively. The viewers may access a server hosting the computer programming system via a network connection.

In general in another aspect the invention features a computer programming system for scripting and executing an application program. The application program is scripted in one human or non-human language and the computer programming system generates one or more instances of the application program translated in one or more human or non-human languages, respectively.

Implementations of this aspect of the invention may include one or more of the following. The application program may be optionally scripted using two or more human or non-human languages. The computer programming system may include a processor for executing the application program under the control of an operating system, a multilingual object oriented programming language system, a viewing program, and a memory associated with the processor. The multilingual object oriented programming language system includes a multilingual scripting program, a parser program, and an execution engine. The multilingual scripting program is used for composing code written in a text file using the one human or non-human language and according to a multilingual object oriented programming grammar. The multilingual object oriented programming grammar comprises one or more task actions, one or more objects, one or more object properties for each of the one or more objects, respectively, one or more translations of each of the one or more task actions, each of the one or more objects, and each of the one or more object properties, in the one or more human or non-human languages, respectively. The parser program converts the code written in the text file into one or more executable task actions and into the one or more object properties. Each of the executable task actions and each of the object properties is translated into the one or more translations of the one or more task actions, objects, and object properties, in the one or more human or non-human languages, respectively. The execution engine executes concurrently the one or more executable task actions upon the one or more object properties of the one or more objects, and the one or more translations of each of the one or more executable task actions upon all translations of the one or more object properties and for all translations of the one or more objects, thereby generating one or more instances of the application program translated in the one or more human or non-human languages, respectively. The viewing program is used for viewing instantaneous results and progress of the execution engine on the one or more executable task actions and the one or more object properties of the one or more objects. The viewing program comprises one or more visual textual displays, and the one or more visual textual displays display the one or more translations of each of the one or more executable task actions, the one or more object properties, and the one or more objects, respectively. The memory is used for storing the operating system, the object oriented programming language system, the viewing program, and the one or more instances of the application program translated in the one or more human or non-human languages, respectively.

In general, in another aspect, the invention features a computer programming method for scripting and executing one or more applications programs. The method includes formulating a problem statement, converting the problem statement into one or more steps that create and manipulate one or more objects, scripting the one or more steps into a collection of one or more textual instructions according to an object oriented programming grammar, parsing the collections of the one or more textual instructions into one or more executable task actions and one or more properties of the one or more objects, and executing the executable one or more task actions upon the one or more objects thereby producing an instance of the one or more application programs. The computer programming method may further comprise viewing instantaneous results and progress of the execution of the one or more task actions upon the one or more objects.

Among the advantages of this invention may be one or more of the following. The Remi programming system provides an intuitive, multi-lingual programming language. Remi Grammar enables programmers to conceptualize the collection of tasks that are needed to accomplish intended objectives, and to express that collection of tasks in a language that is as close as possible to any natural language of choice. Remi Grammar contains a small number of key concepts, i.e., keywords, describing task actions, anti-task actions, objects, object properties, assertion statements and conjunctions. The small number of keywords and the simple syntax of the Remi Grammar make the Remi system readable and writable. In addition to the basic keywords Remi Grammar has the capability to be extended to include user-defined tasks, user-defined objects and user-defined object properties. The Remi programming system is fundamentally multilingual, i.e., provides for multilingual programming and can be used by any individual programmer in the world who has elementary reading and writing skills. The minimum human languages supported by Remi Grammar are English, French, Dutch, German, Italian, Spanish and Swahili. Non-human languages include machine languages and other object oriented programming languages. The Remi dictionary system can be expanded to include any human and non-human languages. Remi script can contain task actions, objects, and object properties expressed in any possible combination of any human and non-human languages. The Remi system is also reliable. It offers unique error checking capabilities that include attempted assignments, object property constraint and integrity checking services applied on objects and object properties and task line constraints and invariants. RemiGrammar and RemiExec incorporate these novel features that implement error-checking and invariance concepts and provide the Remi programmer with essential but simple to use scripting techniques to create run-time robust Remi applications. Furthermore, in order to accomplish the goal of executing as much of the target objective as possible, the executed script is able to handle run-time exceptions due to scripting errors and those due to run-time resource issues. RemiVu offers a combined debugging and monitoring utility that provides a textual display of the Remi App in any possible human and non-human language in real-time during execution. Multiple users can log into the Remi Exec server and view the execution of the RemiApp in the language of their choice. The users may be in any location throughout the world and they may log into the RemiExec server via the Internet. Each user may switch from one language to another in real-time and independent of the other users.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

Referring to the figures, wherein like numerals represent like parts throughout the several views:

FIG. 10 is a block diagram of a programming example using a prior art programming system;

DETAILED DESCRIPTION OF THE INVENTION

Remi System and Method

Figure 1:
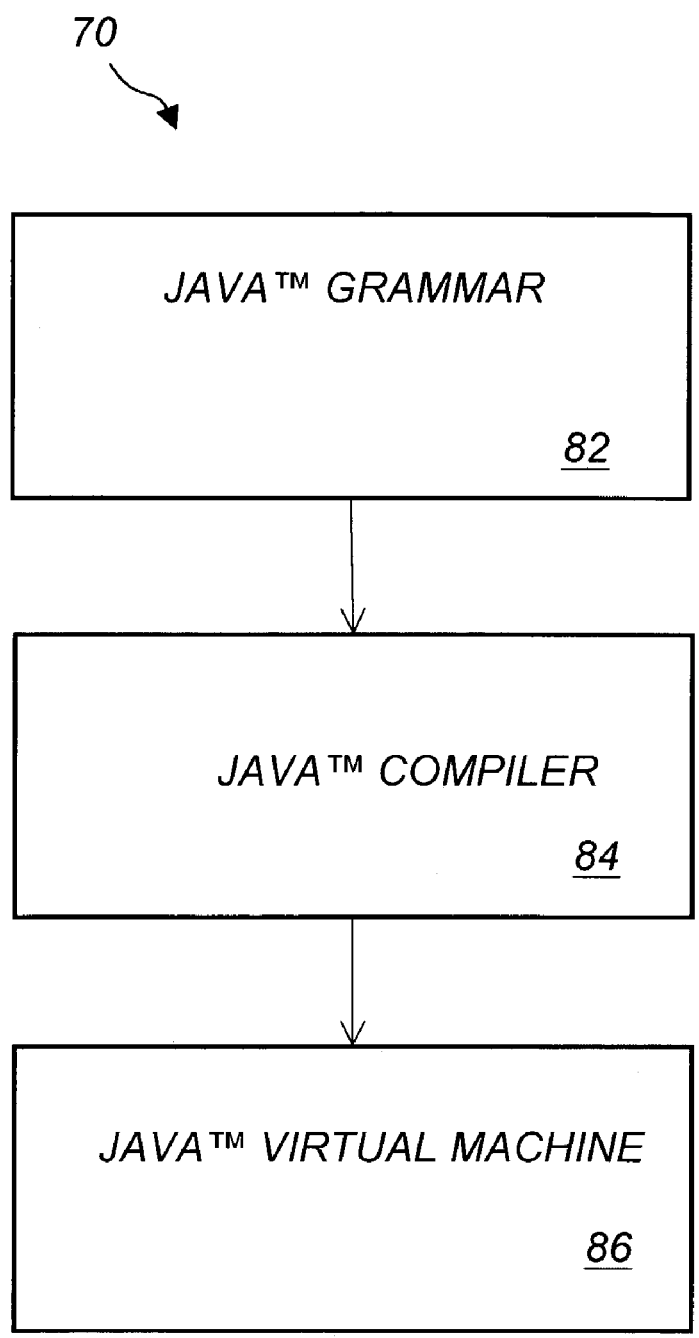
FIG. 1 is a block diagram of the prior art JAVA™ computer programming language system.
Figure 2:
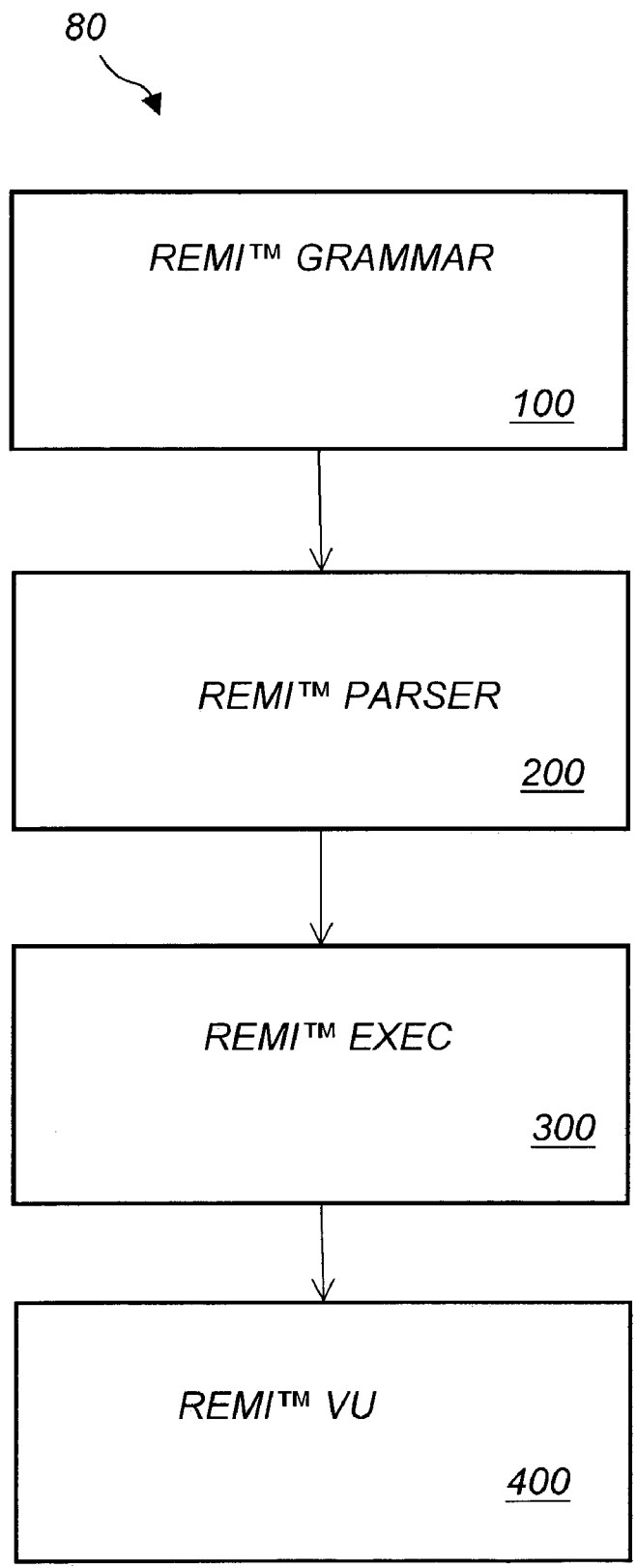
FIG. 2 is a block diagram of the Remi computer programming language system.

Referring to FIG. 2, a Requirement-centric Extensible Multilingual Instruction (Remi) computer programming language 80 is a system of software and hardware components that includes a multilingual grammar 100, i.e., RemiGrammar, a script parser 200, i.e., RemiParser, an execution engine 300, i.e., RemiExec, and an execution-progress viewer 400, i.e., RemiVu. RemiGrammar 100 is a scripting language that provides for multilingual object-oriented programming. RemiParser 200 is a software component that parses one or more scripted files. RemiExec 300 includes software and hardware components that receive and execute the output of RemiParser 200 and produce a User Application, i.e., an instance of a RemiApp. RemiVu 400 is a software component that allows the instantaneous results and progress of RemiExec 300 to be viewed by one or more viewers in several different languages.

Figure 3:
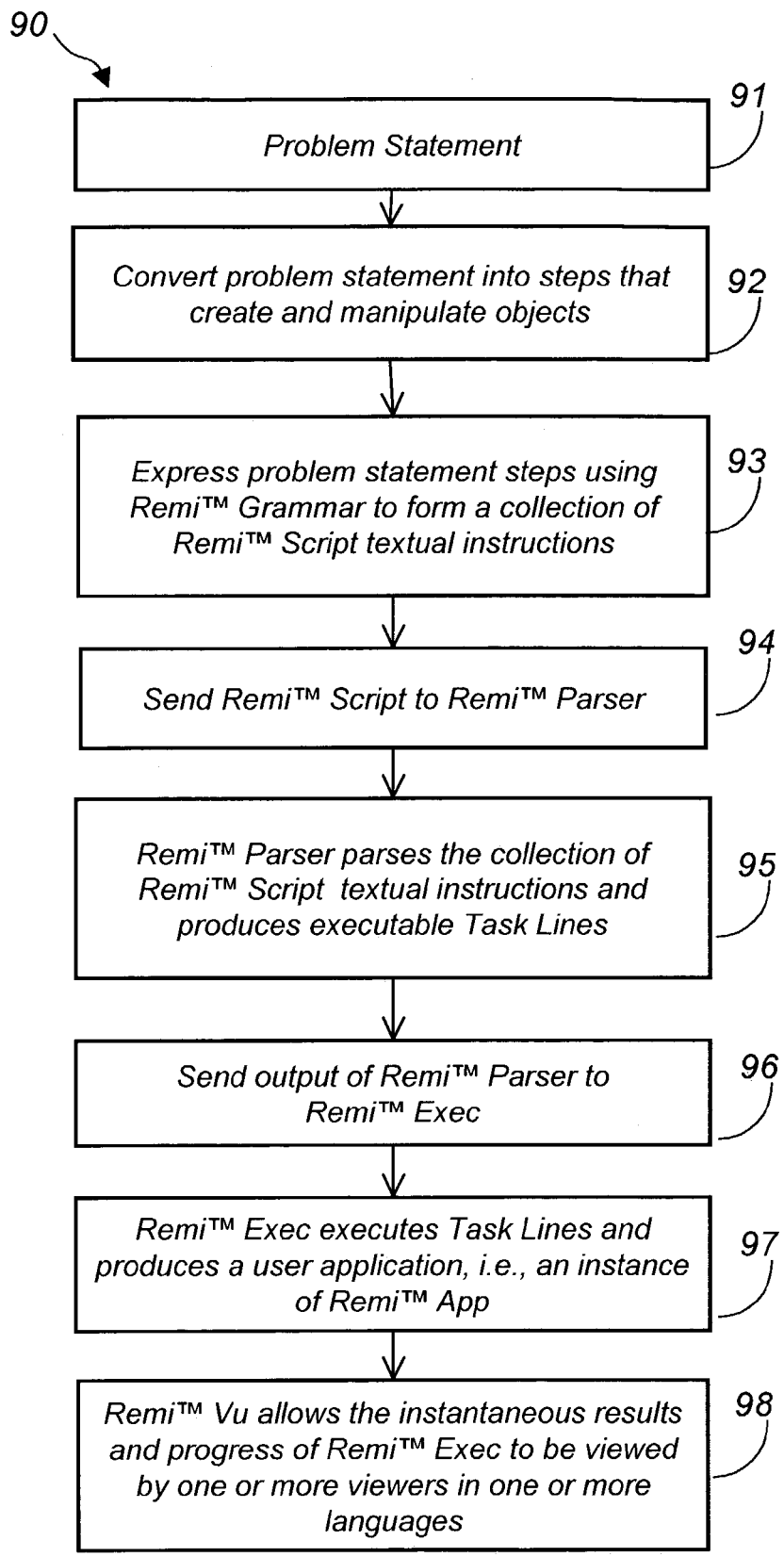
FIG. 3 is a block diagram of the Remi computer programming method.

Referring to FIG. 3 a Remi computer programming method 90 includes the following steps. First formulating a problem statement (91). Next, converting the problem statement into steps that create and manipulate objects (92). Next, scripting the problem statement steps using RemiGrammar and forming a collection of RemiSicpt textual instructions (93), i.e., Task Lines. Next, sending the RemiScipt to RemiParser (94), where the RemiParser parses the collection of RemiScript textual instructions and produces execution-time components, i.e., Remi App Task Lines (95). Next, sending the RemiApp Task Lines to RemiExec (96), where the RemiExec executes the Remi App Task Lines and produces a User Application Software, i.e., an instance of a RemiApp (97). Finally, RemiVu allows viewing the instantaneous results and progress of RemiExec in one or more human or non-human languages (97).

Figure 4:
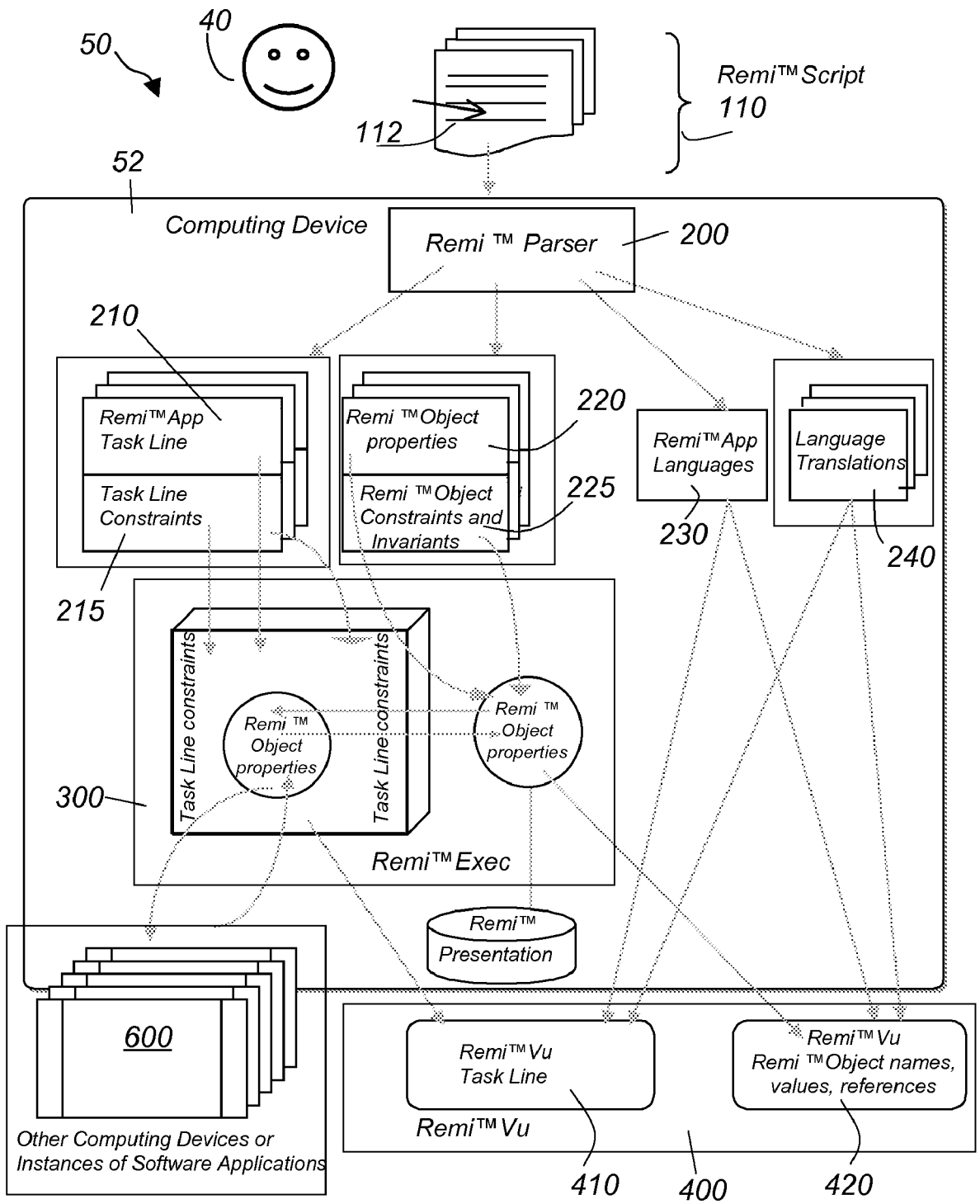
FIG. 4 is a detailed overview diagram of the Remi computer programming system.

Referring to FIG. 4, a user 40 uses scripted instructions 112 and a computing tool 50 to accomplish user objectives by performing specific tasks, i.e., Task Actions. The computing tool 50 includes a computing device 52, and application software 200, 300, 400. Examples of Task Actions include creating, manipulating, transforming, and exhibiting of objects. The Remi system 80 supports a variety of objects, some of which are comparable to variables, structures, classes, interfaces and arrays of other well known object-oriented programming languages including C++ and Java. The user 40 uses a text editor to compose a text file 110, i.e., a RemiSicpt file that conforms to the RemiGrammar syntax and rules. Examples of text editors include Notepad, Microsoft Word, and Word Perfect, among others. The RemiScript file 110 includes scripted instructions 112, i.e., Task Lines, and forms the input file for the RemiParser 200. The RemiParser 200 parses the Task Lines 112 into executable lines, i.e., RemiApp Task Lines 210, RemiObject properties 220, RemiApp Languages 230, and Language translations 240. The RemiApp Task Lines 210, and the RemiObject properties 220 form the input for the RemiExec program 300. RemiExec 300 executes the instructions contained in the RemiApp Task Lines 210 taking into consideration Task Line constraints 215 and RemiObject constraints and invariants 225 and produces an output that includes RemiVu Task Lines 410 and RemiVu RemiObject Names, values and references 420. The RemiVu Task Lines 410 and RemiVu RemiObject Names, values and references 420 can be viewed in any human or non-human language that the user 40 chooses using the RemiVu 400 program. An example of a RemiScript file 110 is shown in Table 1.

TABLE 1

| | |
|---|---|
| Parents is { mom ... dad } | (T1) |
| MyParents is Parents | (T2) |
| Neighbor'sParents is Parents | (T3) |
| My Parents.dad = Clemence | (T4) |
| My Parents.mom = Amelia | (T5) |
| Neighbor'sParents.dad=Paul | (T6) |
| Neighbor'sParents.mom=Ann | (T7) |
| Show MyParents | (T8) |
| Show Neighbor'sParents | (T9) |
| Parents <<Swahili>> Wazazi | (T10) |
| Parents <<Dutch>> Ouders | (T11) |

Lines T2 to T9 are parsed into RemiApp Task Lines 210 and lines T1, T10, and T11 are parsed as RemiObject properties 220. The objects in this example include Parents, MyParents, and Neighbor'sParents.

Remi Grammer

Figure 5:
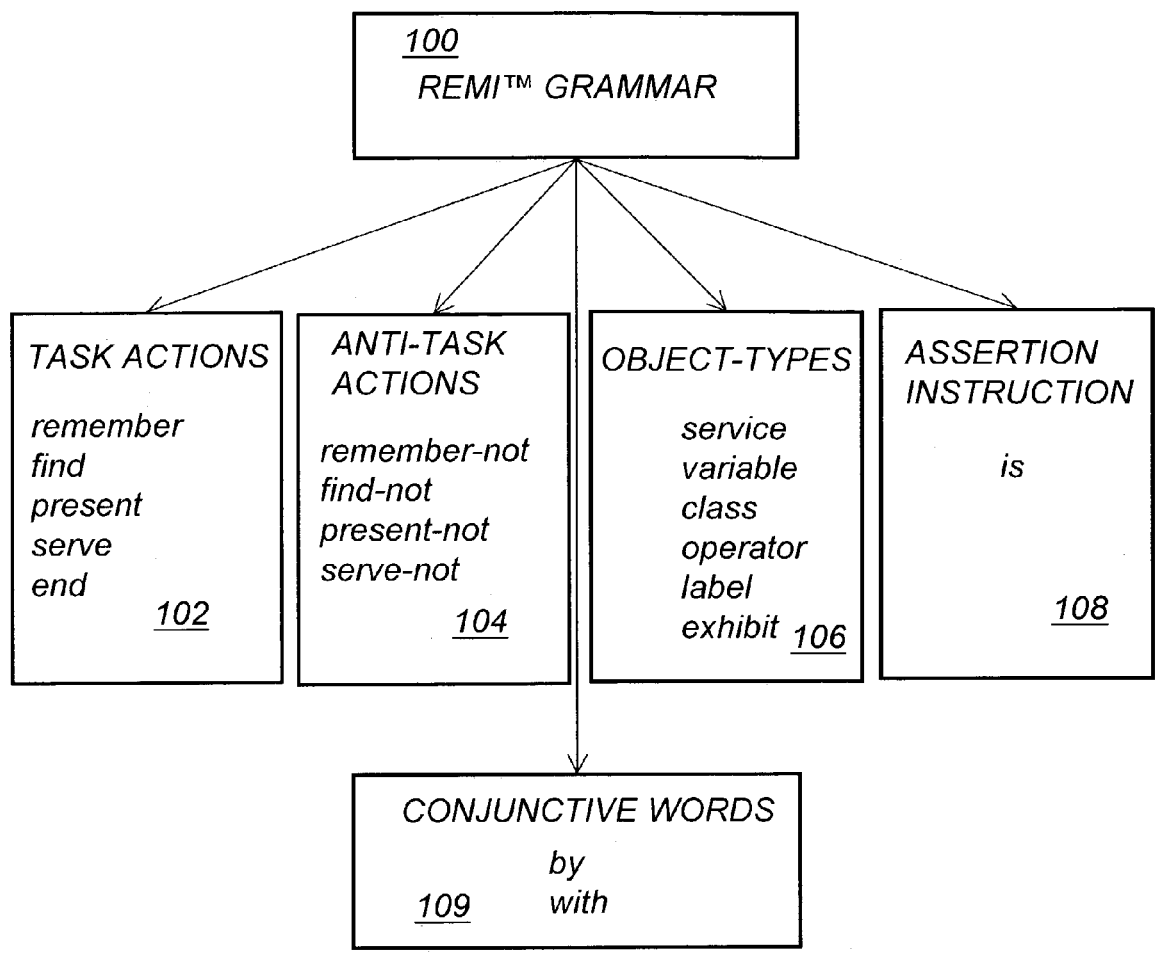
FIG. 5 is a block diagram of the RemiGrammar.

Referring to FIG. 5, RemiGrammar 100 includes five pre-defined ultra-generalized task actions 102, four anti-task actions 104, two pre-defined object types 106, and one assertion instruction 108. The task actions 102 include "remember", "find", "present", "serve", and "end". The anti-task actions 104 include "remember_not", "find_not", "present_not", and "serve_not". The object types include "service", "variable", "class", "operator", "label", and "exhibit". The assertion instruction includes "is". RemiGrammar 100 further includes two conjunctive words 109, "by" and "with".

Remi Task Actions

"remember" is a task action that grants a lasting effect of a task action. In the example of Table 2,

TABLE 2

| | |
|---|---|
| remember A=B+C | (T12) |
| →(B>100)? remember_not | (C13) |

"remember" ensures that 'A' will be updated to be the sum of 'B' and 'C' whenever B or C changes, until B>100 becomes TRUE, at which point the addition will not be remembered.

'find' is a generalized task action to look, find or perform a search.

TABLE 3

| | |
|---|---|
| find A | (T14) |
| →(A not service)? find_not | (C15) |

In the example of Table 3, the "find A" statement searches for A, where A is a service, and launches service A. In one example, A is a service, with a value "www.cnn.com", and the above statement launches a browser with the URL "www.cnn.com". In another example, A is a service with the value "abc.doc", and the statement of T14 locates the application associated with file extension ".doc" and opens the file "abc.doc".

'present' is the generalized output task action that creates a generalized output of values and contents of Remi Objects. The output includes all possible information associated with the Remi Object that is being presented, including RemiObject properties, RemiObject language translations, and RemiObject properties language translations. The default-generalized output is expressed in an Extensible Markup Language (XML) format, which enables the user to use a plethora of applications to present the form, look and feel of the information. In the example of Table 4, Task Lines T21-T23 create an XML file i.e., OutputFile and use it to store XML tags and attributes for:

all properties of object A the value(s), if any, stored in the object A all language translations of object A, and all its properties.

TABLE 4

| | |
|---|---|
| exhibit is OutputFile | (T21) |
| present A | (T22) |
| present OutputFile with A | (T23) |

'serve' is the generalized task action that executes a specialized service by executing a distinct set of self-contained RemiScript instructions. The Remi system supports only one type of looping construct, i.e., a "loop service". A "loop service" must always have at least one terminating condition. In the example of Table 5 a "loop service" is used to calculate for each object P the value of $P^2$. The loop starts with P=0 and ends when P becomes greater than 10, as expressed in Task Line T33.

TABLE 5

| | |
|---|---|
| serve | (T31) |
| P=0 | (T32) |
| (P>10)? End | (T33) |
| P = P+1: present ^2 | (T34) |
| end | (T35) |

In the example of Table 6, a service is defined that has a distinct identifier, i.e., LargestNumber. The identifier is used to invoke the service whenever and wherever the service is needed.

TABLE 6

| | |
|---|---|
| service LargestNumber is | (T36) |
| (A > B) ? | (T37) |
| // A is larger than B ... Greatest is either A or C | (T38) |
| (.... A > C) ? X=A | (T39) |
| (.... A < C) ? X=C | (T40) |
| // A is less than B ... Greatest is either B or C | (T41) |
| (..A < B)? | (T42) |
| (.... B > C) ? X=B | (T43) |
| (.... B < C) ? X=C | (T44) |
| (..end) | (T45) |
| end LargestNumber | (T46) |

In the Remi system, conditional statements, as shown in Task Lines T39, T40, T42, T43, and T44, are active TRUE only, that is, action is performed only if the condition is determinedly TRUE. The programmer can use continuation marks '. . . ' to be explicit about the position of a conditional test in a decision tree.

'end' is the generalized task action that terminates, finishes, completes or aborts the current service.

Remi Objects

Remi supports a variety of objects, some of which can be compared to variables, structures, classes, interfaces and arrays of C++ and Java. Referring to Table 7, the Remi object types include services, variables, classes, operators, labels and exhibits.

TABLE 7

| RemiObject type | Description |
|---|---|
| service objects | object identifying a set of task actions |
| variable objects | value, or set of values, represented by object |
| class objects | set of properties and services encapsulated by object |
| operator objects | resulting outcome of a set of task actions and operations |
| label objects | character string of object-name |
| exhibit objects | object used to create an output |

"service" is both a qualifier and an object-type. It is used as a qualifier to mark a distinguishable set of RemiScript instructions with an unambiguous 'start of service', and 'end of service'. It is also the object-type assigned to an object that references, or identifies, the aforementioned distinguishable set of RemiScript instructions. In the example of Table 6, the set of Task Lines T36 to T46 is the object-type for the performed "service LargestNumber".

A "variable" RemiObject is comparable to primitive variables in C/C++ and Java. However, RemiGrammar and RemiExec implement, support and manage variable RemiObjects in accordance with the RemiObject integrity and error checking model of FIG. 9. This model is the basis for robust variable RemiObject scripting.

A "class" RemiObject is a set of properties. This makes the definition of RemiObject very simple, as exemplified by Obj_1 shown in Table 8 below.

TABLE 8

| Obj_1 | is { a..b..c..d } | (T47) |
|---|---|---|
| Obj_2 | isObj_1..{ e..f } | (T48) |
| ArrObj[ ] | is Obj_1 | (T49) |

Another class RemiObject, Obj_2, is defined as inherited from Obj_1 with additional properties. Obj_1 and Obj_2 are both object instances, as well as templates (classes) for other object instances. ArrObj is defined as an array of RemiObjects of types Obj_1.

An "operator" RemiObject is the resulting outcome of a set of task actions and operations. An example of an operator is "combine" in Task Line T101 of Table 11.

A "label" RemiObject is a character string of an object name. An example of a label is 'Mathematics' in Task line T57 in Table 10.

'exhibit' is the object-type assigned to an object that references or identifies the object to be used to create an output. In the example of Table 4, Task Line T21 defines the object "OutputFile" that is used to store the output for object A.

Furthermore, Remi supports arrays of the above mentioned object types. Array elements can be either numerical-index based, or label-index based. Table 21 specifies the syntax for defining, creating, manipulating and using RemiObjects. When using label-based indexed arrays, the label index is a pure label. For example, in the following conditional test:

(ArrFirst[GREATEST]==ArrSecond[GREATEST])? (T101)

there is no correlation between positions of the array elements ArrFirst[GREATEST] and ArrSecond[GREATEST] in their respective arrays.

The properties of RemiObjects are either value-centric or service-centric. Service-centric properties are essentially RemiObject properties that can not be assigned values. Service-centric properties however, have full access to all properties of instance of RemiObjects to which they belong. Value-centric properties can be assigned values (numerical or alphanumerical), or can be references to RemiObject. Accessing values of Value-centric Properties is done thru Service-centric properties called 'accessors' that have the same name as the property.

TABLE 9

| Obj_1.a | = 345 | (T50) |
|---|---|---|
| x | = Obj_1.a + 12 | (T51) |

In the example of Table 9, Task Line T50 stores 345 into Obj_1.a, and reads back this value in T51. In each of these cases however, RemiExec will invoke a user-defined service called Obj_1.a. In case T50, Obj_1.a will be invoked with the 'proposed write value' of 345. The user is expected to provide logic for Obj_1.a that will perform an integrity check on the value being written into Obj_1.a, or being read out of Obj_1.a, to be passed on to RemiApp.

Assertion Instruction

'is' is the assertion instruction. Examples of assertion instructions are shown in Table 10.

TABLE 10

| A[20] | is 1 | (T52) |
|---|---|---|
| p | is 5 | (T53) |
| integer | is 1 | (T54) |
| N[10] | is integer | (T55) |
| Names[4] | is "abcdefghijklmn" | (T56) |
| Mathematics is Mathematics | | (T57) |
| Chemistry | is Chemistry | (T58) |
| (p | is 1.234 )? | (T59) |
| ( Mathematics is Chemistry )? | | (T60) |

Task line T52 asserts that 'A' is an array of 20 elements, and that each element is of type '1'. i.e., an integer. If any element of the array is not initialized, then it will be initialized to have a value of '1'. Task line T53 asserts that 'p' is a simple variable of type '5'. i.e., an integer. If it is not initialized, then it will be initialized to have a value of '5'. Task line T54 asserts that 'integer' is a simple variable of type '1'. i.e., an integer. If it is not initialized, then it will be initialized to have a value of '1'. Task line T55 asserts that 'N' is an array of 10 elements, and that each element is of the same type as that of object 'integer', i.e., an integer. If any element of the array is not initialized, then it will be initialized to have the value held by the object 'integer'. Task line T56 asserts that 'Names' is an array of 4 elements, and that each element is of type "abcdefghijklmn", i.e. an alphanumerical string of length 10 characters. If any element of the array is not initialized, then the element will be initialized to have a value of 'abcdefghijklmn'. Task line T57 asserts that 'Mathematics' is a simple object of its own type, i.e. 'Mathematics' is a label. The same is valid for task line T58. Task line T59 tests the assertion that object 'p' is of the same type as '1.234', i.e. a real number. Since 'p' is an integer, and since the set of all integers is a subset of all real numbers, then the assertion test will be TRUE. Task line T60 tests the assertion that object 'Mathematics' is of the same type as 'Chemistry'. Since 'Mathematics' is a 'label of type Mathematics', and 'Chemistry' is a 'label of type Chemistry', then the assertion test will be FALSE.

Remi Script

Figure 6:
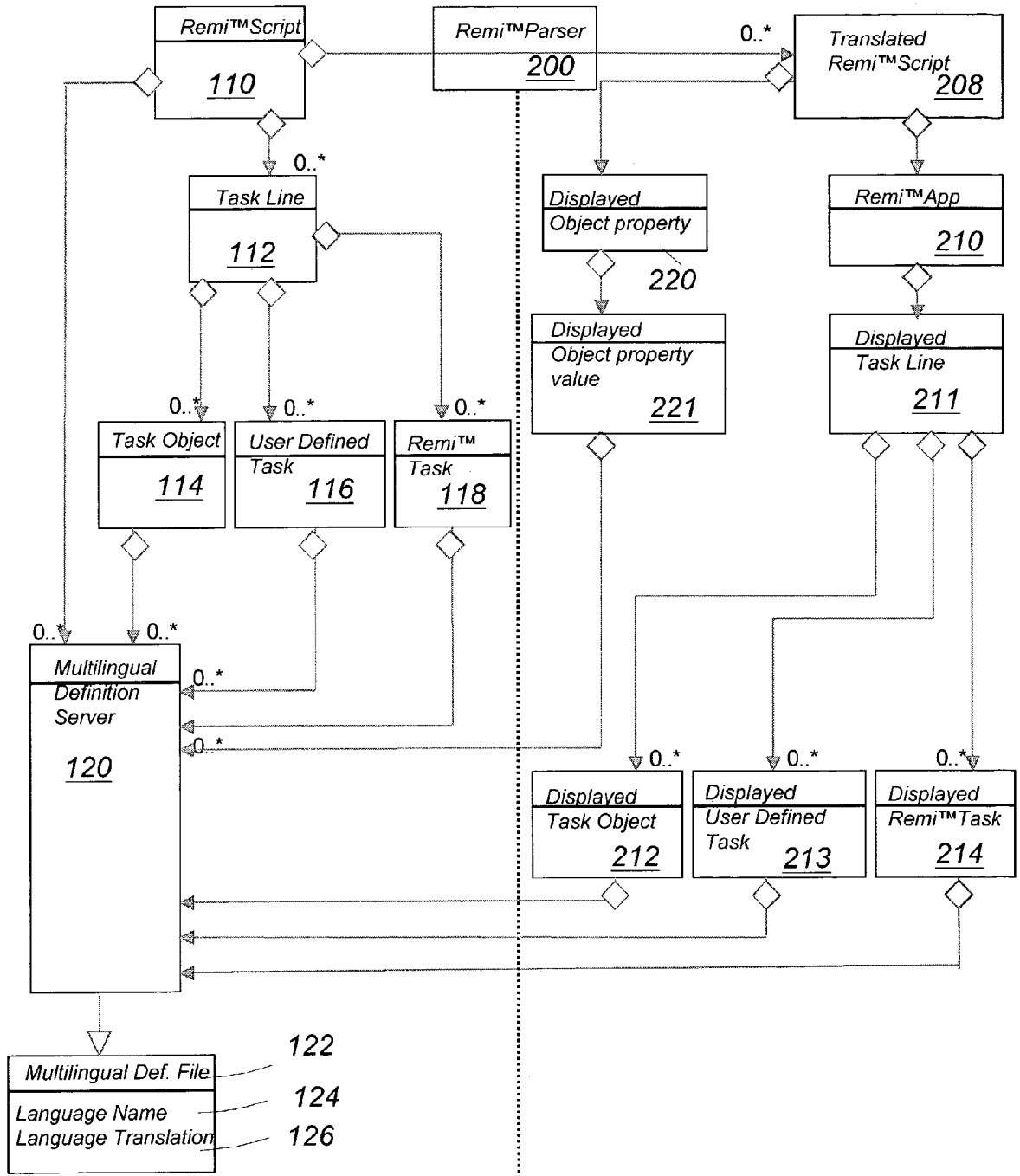
FIG. 6 is a block diagram of the RemiScript file and the translated RemiScript file.

Referring to FIG. 6, the structure of the RemiScript text file 110 and the structure of the executable Translated RemiScript 208 file are displayed. RemiScript text file 110 is the input to the RemiParser 200 and the Translated RemiScript 208 is the output. RemiScript file 110 includes N Task Lines 112. N may be any number between 1 and $2^{31}=2,147,483,648$. Each Task Line 112 includes N Task Objects 114, N User Defined Tasks 116, and N RemiTasks 118. In one example, Task Object 114 is the variable A in Table 2. RemiTasks 118 include the previously defined Task Actions 102 and Anti-Task Actions 104. A unique feature of the Remi system is the capability to introduce new User Defined Tasks 116. User Defined Tasks 116 are new concepts that the user 40 introduces and/or new language translations of the RemiTasks 118. Examples of User Defined Tasks include among others, "delete", "create", or new language translations for the RemiTasks 118. In one example, a User Defined Task is the German word "erzeuge" for the concept of "create". In another example it is the Greek word "παραγε" for the concept of "create". The Task Objects 114, the User Defined Tasks 116, the RemiTasks 118 and the entire RemiScript 110 enter a Multilingual Definition Server 120 and are stored in a Multi Definition file 122 that includes the various human or non-human language names 124 and the corresponding human or non-human language translations 126 for the above mentioned items. In one example, the Multi Definition file 122 is a database and it may include dictionaries of any number of human languages. In other examples Multi Definition file 122 includes non-human languages, and machine languages. In another example, Multi Definition file 122 is located on a central server and is accessible via the Internet to any user 40 throughout the world. In one example, the language names 124 are English, French, and Swahili and the language translations 126 include the corresponding words in English, French, and Swahili for the above mentioned Task Objects 114, User Defined Tasks 116, the RemiTasks 118 and the entire RemiScript 110.

The Translated RemiScript 208 file includes the executable RemiApp Task Lines 210 and the displayed RemiObject properties 220. Each RemiApp Task Line 210 includes a displayed Task Line 211 and each RemiObject Property 220 includes a displayed RemiObject Property value 221. Displayed Task Line 211 and displayed RemiObject Property value 221 are the executable Task Lines and Object Properties, respectively, as they are displayed by the RemiVu software 400 and viewed by the user 40. Each displayed Task Line 211 includes the corresponding displayed Task Objects 212, the displayed User Defined Tasks 213, and the displayed Remi Tasks 214, which are also displayed by the RemiVu software 400 and viewed by the user 40. The displayed Task Objects 212, the displayed User Defined Tasks 213, the displayed Remi Tasks 214 and the displayed Remi Object Property values 221 enter the Multilingual Definition Server 120 and are stored in the Multi Definition file 122, as well. The minimum languages supported by RemiGrammar are English, French and Swahili. As was discussed above in FIG. 6, a programmer can add as many additional languages as are needed. In order to encourage re-usability of RemiScripts irrespective of the natural languages that are used, RemiGrammar provides flexibility in how instructions are expressed through its rules of grammar and via two conjunctive words i.e., "by", and "with". These two features provide to programmers great flexibility in specifying instructions that perform the required tasks while simultaneously expressing their intentions in an easily readable form.

In the example of Table 11, for the given User-defined binary operators '_combine_' and '_sort_', and User-defined objects A and B, the Task Lines T101-T103 are all equivalent, however, an English-speaking programmer is likely to use Task Line T102.

TABLE 11

| A _combine_ B | (T101) |
| _combine_ A with B | (T102) |
| _combine_ B by A | (T103) |

In the example of Table 12, Task Lines T104-T106 are also equivalent, but in this case, an English speaking programmer is likely to use Task Line T106.

TABLE 12

| A _sort_ B | (T104) |
| _sort_ A with B | (T105) |
| _sort_ B by A | (T106) |

In the example of Table 13, a service is defined that determines the largest of three numbers. The following default language definitions are introduced:

LargestNumber—English

PlusGrandNumero—French

KubwaZaidi—Swahili

Task Lines T61-T69 are all equivalent, however, an English-speaking programmer is likely to opt for T61, a French-speaking programmer for T65, and a Swahili-speaking programmer for T69.

TABLE 13

| A=20 B=30 C=25 | serve LargestNumber | (T61) |
| A=20 B=30 C=25 | servir LargestNumber | (T62) |
| A=20 B=30 C=25 | hudumia LargestNumber | (T63) |
| A=20 B=30 C=25 | serve PlusGrandNumero | (T64) |
| A=20 B=30 C=25 | servir PlusGrandNumero | (T65) |
| A=20 B=30 C=25 | hudumia PlusGrandNumero | (T66) |
| A=20 B=30 C=25 | serve KubwaZaidi | (T67) |
| A=20 B=30 C=25 | servir KubwaZaidi | (T68) |
| A=20 B=30 C=25 | hudumia KubwaZaidi | (T69) |

Because 'serve LargestNumber' reads awkwardly, the User could define a Left-Side operator 'determine', as shown in Table 14.

TABLE 14

| | determine | X >> is | (T71) |
| X is service | (T72) |
| serve X | (T73) |

TABLE 14-continued

| end | (T74) |
| determine <<francais>>determiner | (T75) |
| determine <<swahili>>chambua | (T76) |

With the above user-defined operator, Task Line statements T61-T69 can be simplified as shown in Table 15, Task Lines T81-T83.

TABLE 15

| A=20 B=30 C=25 | determine LargestNumber | (T81) |
| A=20 B=30 C=25 | determiner PlusGrandNumero | (T82) |
| A=20 B=30 C=25 | chambua KubwaZaidi | (T83) |

A programmer can introduce a new language through a definition statement. In one example, a Dutch translation for "determine" and "LargestNumber" are introduced simply as follows:
determine<<dutch>>uitrekenen
LargestNumber<<dutch>>GrootsteNummer The request in Task Lines T81-T83 of Table 15, can now be expressed in Dutch as follows:

| A=20 B=30 C=25 | uitrekenen GrootsteNummer | (T84) |

Error Checking

Contemporary software development and engineering have been ailed by the challenge to produce robust software. RemiGrammar and RemiExec incorporate novel features that implement Error-Checking and invariance concepts that provide the Remi programmer with essential but simple to use scripting techniques to create run-time robust Remi applications. Furthermore, in order to accomplish the goal of executing as much of the target objective as possible, the executed script is able to handle run-time exceptions due to scripting errors and those due to run-time resource issues.

Figure 8A:
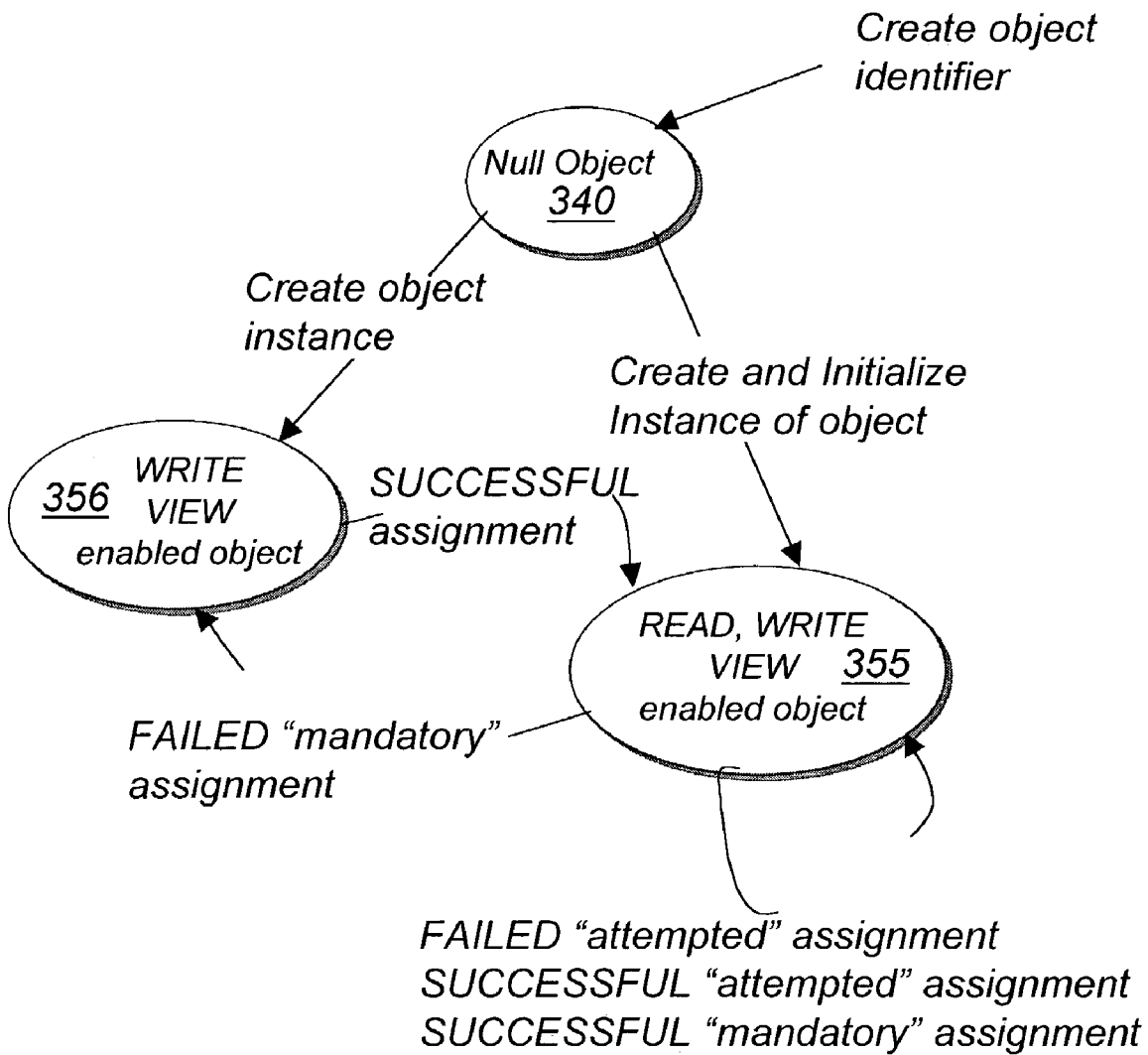
FIG. 8A is a schematic diagram of the states of a RemiObject.
Figure 8B:
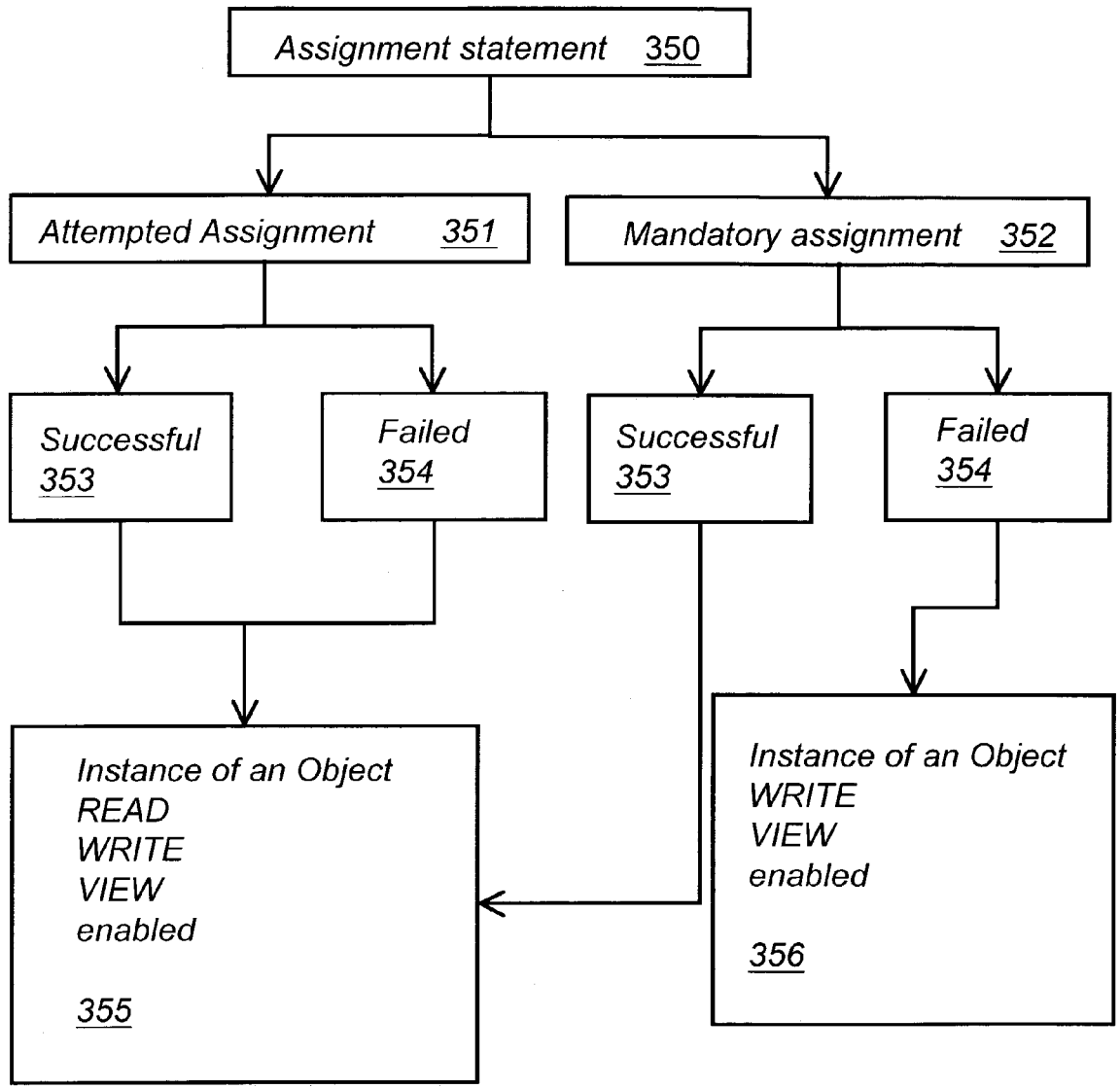
FIG. 8B is schematic diagram of a Remi assignment statement.

Error Checking is supported by RemiGrammar primarily through the use an 'attempted assignment' statement, as well as a self-conditional test. RemiExec provides support through its handling of assignment statement, while adhering to the principle of executing as much of the user objectives as possible. Referring to FIG. 8A and FIG. 8B, an assignment statement 350 is either an attempted assignment 351 or a mandatory assignment 352. During the execution of the program, if an attempted assignment is successful 353 the instance of the object is READ, WRITE, and VIEW enabled 355, the value of the object is updated and the object can be used in any calculation. If the attempted assignment fails 354 the object is not updated and its read, view and write access will remain unchanged. In the case of a mandatory assignment 352, only if the mandatory assignment is successful 353 is the instance of the object READ, WRITE, and VIEW enabled 355. If the mandatory assignment is failed, as defined by the error condition, the instance of the object does not get updated and cannot be used in the calculation, i.e., is only WRITE and VIEW enabled 356 and not READ enabled.

According to RemiExec, an error condition is significant only when an assignment operation is requested, otherwise RemiExec flags the outcome as erroneous, but continues to execute. If the script instruction has requested a 'mandatory assignment', and the assignment is failed, then the assigned object will not be updated, and will be marked as WRITE and VIEW only, which means that any attempt to read that object will itself be an error-condition, while any WRITEs will be permitted. All successful assignments will render the assigned object as READ, WRITE, and VIEW enabled. If the script instruction had requested an 'attempted assignment', then a failure to make the assignment will not alter the 'accessibility' of the target object. In one example, the script instruction of the "mandatory assignment",

A=1

$A=100/0.0$ will assign an invalid value to 'A', rendering 'A' to be WRITE and VIEW only, and containing no valid value. In another example, the script instruction of the "attempted assignment"

A=1

$A$ is $100/0.0$ will fail to change the value of 'A', and will leave 'A' as, READ, WRITE and VIEW enabled, with 'A' containing the last valid value of '1'.

Another method for error checking used in Remi system is conditional testing. Conditional testing includes condition tests for object properties and Task Line constraints and anti-task-actions for which the conditions are TRUE. If the constraint conditions are true, they will disable a task, or the action of a Task Line. Furthermore, RemiExec implements conditional testing as being either TRUE or OTHERWISE. This implies that a run-time error condition that occurs during a condition test shall render the entire condition test not TRUE. As was mentioned before, conditional statements in Remi are active TRUE only, that is, action is performed only if the condition is determinedly TRUE.

Figure 7:
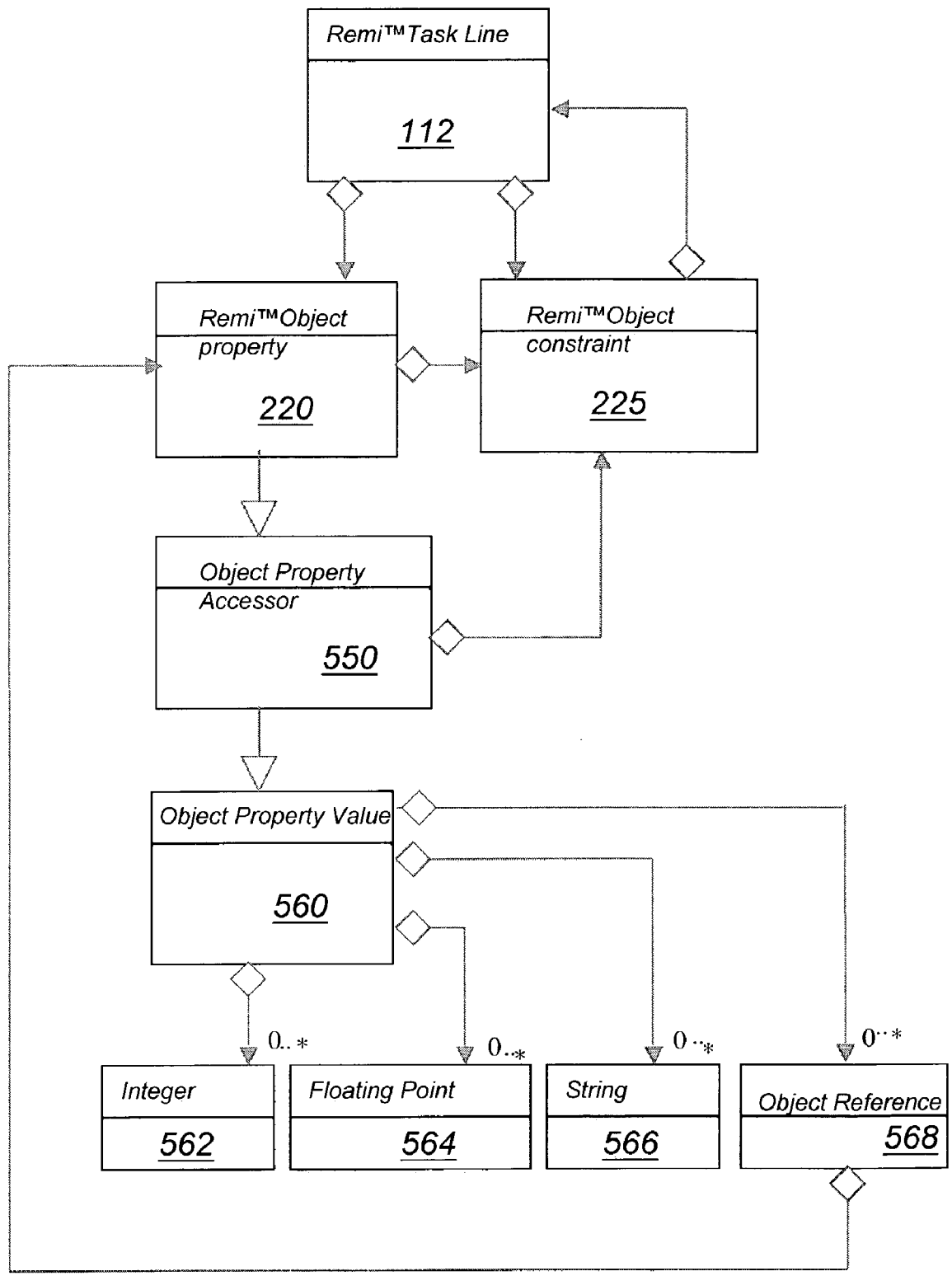
FIG. 7 is a block diagram of a RemiTask Line.
Figure 9:
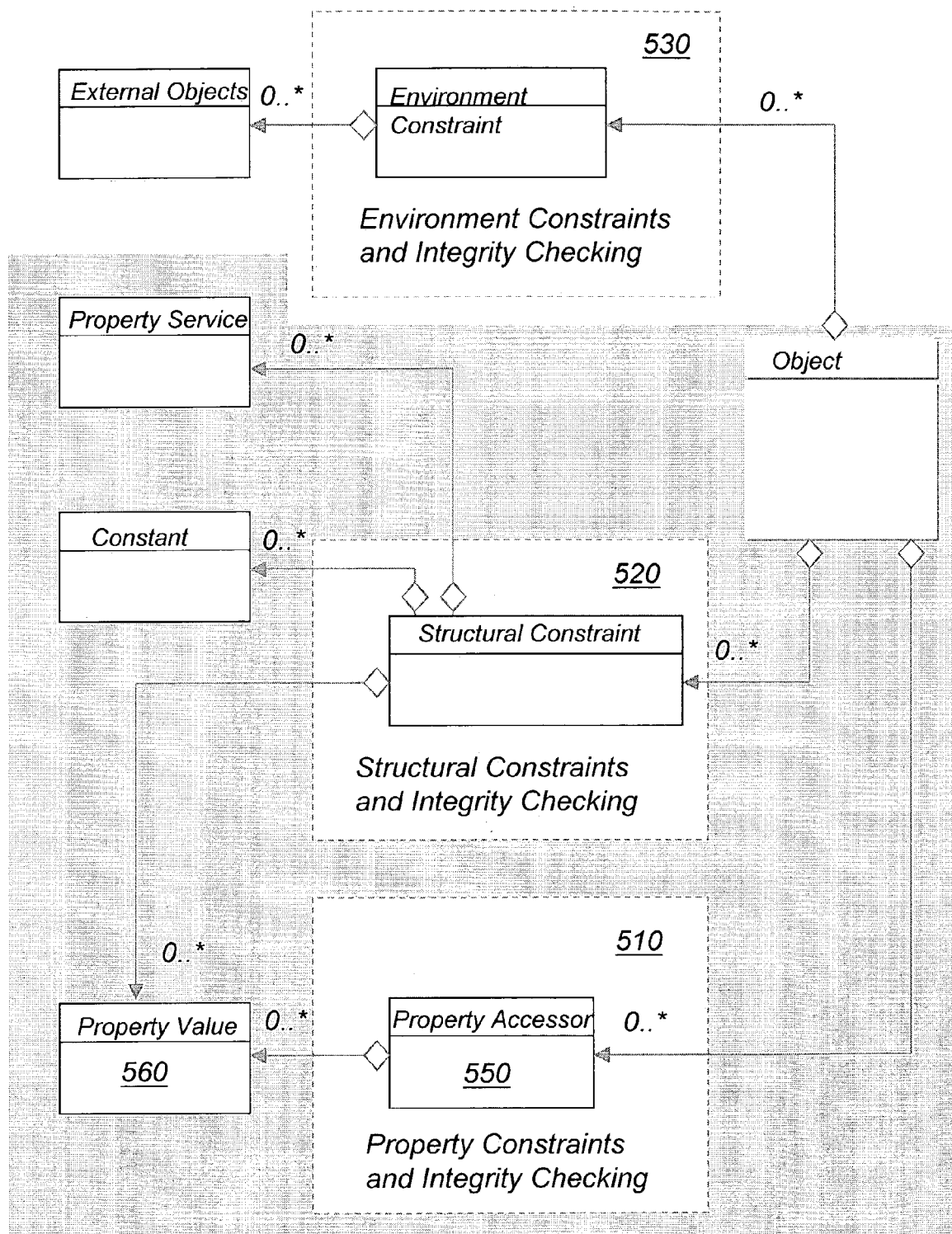
FIG. 9 is a block diagram of the Remi error checking process.

Referring to FIG. 9, the Remi system 80 provides three levels of object error and integrity checking, including checking for object property constraints and integrity 510, checking for object structural constrains and integrity 520, and checking for environment constraints and integrity 530. Referring to FIG. 7, a Remi Task Line 112 includes RemiObject property 220 and RemiObject constraint 225. At the first level of object error and integrity checking, each object property 220 passes through an Object Property Accessor 550 that evaluates and assigns a property value 560. Object property values 560 include integer values 562, floating point values 564, string values 566, and object references 568. Remi Object properties 220 are always value-centric, whereas Task Line constraints 215 are either value-centric or service-centric. An Object Property Accessor 550 assesses the values of value-centric properties by applying user-defined services. These user-defined services check the validity and integrity of the property values at the time of each access including READ and WRITE actions. At the next level, the object-structural integrity 520 is enforced by specifying the constraints and invariants to be applied to the entire object at the time of each external access, i.e., READ, WRITE, or simple invocation of the object. The object integrity and error-checking model assumes that all information required for object structural integrity is internal to the object.

Accordingly, RemiGrammar and RemiExec expect all object structural integrity constraints to reference properties that belong to the object.

TABLE 16

| | |
|---|---|
| Obj_1->Obj_1 is | (P131) |
| -->( a<1000) ? | (C131) |
| -->( a >0     ) ? | (C132) |
| -->( b<1000) ? | (C133) |
| -->( b >0 ) ? | (C134) |
| -->(c > 0 ) ? | (C135) |
| -->( (a^2 + b^2) = = c^2 ) ? | (C136) |
| end | |

In the example of Table 16, each time any property of Obj_1 is accessed (read, write, invocation), RemiExec will ensure the access is successful if, and only if, the listed conditions are TRUE, otherwise the intended access will return a FAILED. The third level of object integrity and error checking is enforced by specifying the constraints that must apply to the environment in which the object is created, and expected to be used. These constraints are applied to the entire object each time a property of the object is accessed externally (read, write or simple invocation).

Invariance is supported by RemiGrammar primarily through the use of unambiguous, un-encumbering constraints that are associated with the constrained instructions. This enables a wide variety of technological implementation of constraint-checking, such as RemiExec's executing the constraints before, during, and after the execution of the constrained instructions, and aborting and undoing the constrained instructions should the constraints be violated. An example of this is shown in Table 17.

TABLE 17

| | |
|---|---|
| present A B C D E remember A=B+C serve LargestNumber | (T151) |
| -->(A= =B)? present_not | (C152) |
| -->(C < 2)? | (C153) |
| -->(D > 10)? serve_not | (C154) |

Interaction with other Computing Devices or Software Applications

In general users regard the multitude of widely available software applications as invaluable computing resources. Accordingly, RemiGrammar and RemiExec are structured to view these software applications as computing resources, as well. RemiGrammar provides scripting support that enables data to be exchanged with, and manipulated by applications, while RemiExec manages the connections between sessions, as well as the exchange of commands between applications 600, shown in FIG. 4. Referring to Table 18 in Task Line T91, the text between the first occurrence of the sequence of "12" (inclusive) and the following first occurrence of the sequence of "67" (exclusive) in the file "d:\numbrs.doc" will be copied to the current text position in "d:\abcd.doc". In Task Line T92, the string "* thank you *" will be copied into "d:\abcd.doc" at the occurrence of the pattern "fg".

TABLE 18

| | |
|---|---|
| {["d:\numbrs.doc" @ "12" .. @"67"]} → {[" d:\abcd.doc"]} | (T91) |
| {["*** thank you ***"]} → {["d:\abcd.doc" @"fg"]} | (T92) |

RemiExec manages the entire, launching of the registered application associated with 'numbrs.doc', performing the requested searches, and terminating the launched registered application upon completion. RemiGrammar provides scripting capabilities to programmatically issue common commands to instances of common applications.

EXAMPLE OF REMI SCRIPTING

The individual basic features of Remi that enable objective-oriented robust multilingual script programming, are such that they can be combined to provide a scripting methodology that is also multiphase. Each successive phase is a refinement of the preceding phase. Script lines T301-T485, shown in Tables 19 and 20 are an example of script statements signifying the intended objective of the scripted RemiApp.

In Task Lines T301-T302 of Table 19, a store owner of a computer supplies store defines a problem statement. The store owner would like to monitor the stock inventory and generate a stock report daily and upon request.

TABLE 19

| | |
|---|---|
| //Level-1 Requirements Specifications <STORE_OWNER> | |
| monitor stock | (T301) |
| generate stock report daily | (T302) |
| generate stock report upon request | (T302) |

Task Lines T401-T404 of Table 20 show a clarification of the problem statement of Task Lines T301-T304. Task Lines T410-T485 show increasing details governing the clarified intended objectives of Task Lines T401-T404.

TABLE 20

| | |
|---|---|
| //---- Level-1 Requirements Specifications <STORE_OWNER> | (T401) |
| monitor stock | (T402) |
| every day generate stock report | (T403) |
| upon request generate stock report | (T404) |
| //---- Level-2 Requirements Specifications <STORE_MANAGER> | (T410) |
| \| every \| day > is | (T411) |
| ( day = _SUNDAY_ ) ? end | (T412) |
| ( day = _SATURDAY_ )? end | (T413) |
| (_TIME_ = _8AM_ ) ? remember | (T414) |
| end | (T415) |
| \| upon \| req > is | (T416) |
| ( _REQUESTOR_ = _MANAGER_ )? remember | (T417) |
| end | (T418) |
| //---- Level-3 Requirements Specifications <STORE_CLERK> | (T431) |
| \| stock \| Y > is | (T432) |
| ( Y is report) ? remember StockItems | (T433) |
| end | (T434) |

TABLE 20-continued

```
< X | generate | Y > is                                                    (T435)
        ( ..X is __MANAGER__ ) ? present __MANAGER__.stdout with Y         (T436)
        (..OTHERWISE) ? present __STDOUT__with Y                           (T437)
end                                                                        (T438)
//---- Level-4 Requirements Specifications <REMI_SCRIPTER>                 (T451)
TRUE is TRUE                                                               (T452)
FALSE is FALSE                                                             (T453)
StockItem is { ItemName..CurrQty..IdealQty..QtyUnits..ReduceQty..IncreaseQty }
                                                                           (T454)
Store_Stock is StockItems[ ]                                               (T455)
item_Floppies is item_Floppies                                             (T456)
item_CDROMis item_CDROM                                                    (T457)
item_Mac   is item_Mac                                                     (T458)
item_PalmPilot              is item_PalmPilot                              (T459)
| Monitor | stock> is                                                      (T460)
        (StoreAction.Action = = purchasing)? Decrease stock by StoreAction.Amount   (T461)
        (..StoreAction.Action = = re_stocking)? Increase stock by StoreAction.Amount (T462)
            (..end)                                                        (T463)
            stock->CheckStockLevel                                         (T464)
end                                                                        (T465)
StockItem.ItemName           is ""                                         (T466)
StockItem.CurrQty            is inteja_zero                                (T467)
StockItem.IdealQty           is inteja_MAX                                 (T468)
StockItem.QtyUnits           is ""                                         (T469)
StockItem->CurrQty is                                                      (T470)
        (CurrQty < 0 )?   CurrQty = 0                                      (T471)
end                                                                        (T472)
StockItem->CheckStockLevel is                                              (T473)
        (CurrQty < IdealQty )? StockWARN = TRUE                            (T474)
        (..CurrQty < 0.5*IdealQty)? StockERR= TRUE                         (T475)
        (..              )? StockWARN=FALSE   StockERR=FALSE               (T476)
        (..end           )                                                 (T477)
end                                                                        (T478)
< stock | Decrease | change > is                                           (T479)
(stock is StockItem)? (change is inteja)? stock.CurrQty = stock.Curry Qty- change
                                                                           (T480)
end                                                                        (T481)
< stock | Increase | change > is                                           (T482)
(stock is StockItem)? (change is inteja)? stock.CurrQty = stock.CurrQty + change   (T483)
end                                                                        (T484)
StockItem[item_Floppies].ItemName = "3M floppy disks"                      (T485)
```

Multi-Lingual Programming

Many prior art programming languages, including Java™ and C++, offer programming capability to create multilingual content, or to output multilingual messages to users running the programmed application. However, Remi is unique in providing multilingual programming capability to programmers to specify instructions i.e., task actions, in any language of their choice. This feature improves readability and writability, and significantly simplifies multi-language programming in general.

The following problem description will be used by way of example to distinguish Remi's capabilities:

1. obtain a person's name
2. obtain the person's age
3. show the welcoming message "Hello World"
4. show the person's name
5. show the person's age Since the above problem could occur to anyone anywhere in the world, the above steps could easily have been written in any language other than English, but the essential problem would remain exactly the same. Once the problem is to be computerized, a programming language such as Java™ or C++ is selected, and the above problem statements are converted into Java™ statements, or C++ statements. However, the nature of the process of program development is such that a number of iterations and changes are necessary to the actual program, as the problem becomes better understood, and as the limits and constraints of the target computing devices become clearer. Often, the most valuable asset then becomes the program instructions themselves, as the program becomes the most accurate embodiment of the problem being solved.

Referring to FIG. 10, the above problem is coded in English using C++, as shown in 613. In order to write the program in French as shown in 611, or Swahili as shown in 612, then the programmer would need a 'dictionary' such as that shown in 610 based on the '#define' compiler directive. This directive uses the popular and prevalent 'string substitution' mechanism whereby strings of characters (for example 'nombre' in 611), are converted into the syntactically correct and acceptable forms (in the case of 611, 'nombre' is changed into 'int'), prior to sending the program statements to the actual compiler. This is necessary because a C++ program has a single instance that is sent to be compiled. This has the following implications:

- the programmer must choose one form only (611 or 612 or 613) to be the program
- any editing changes made are effective when made to the selected form (only one of 611, 612 or 613)
- 612 and 613 can not be executed as shown; they must be converted to 613 (done automatically by the pre-compilers) for execution
- although it is possible to convert from 611 to 613, and 612 to 613, it is not possible to convert from 613 to 611, or 613 to 612.

Figure 11A:
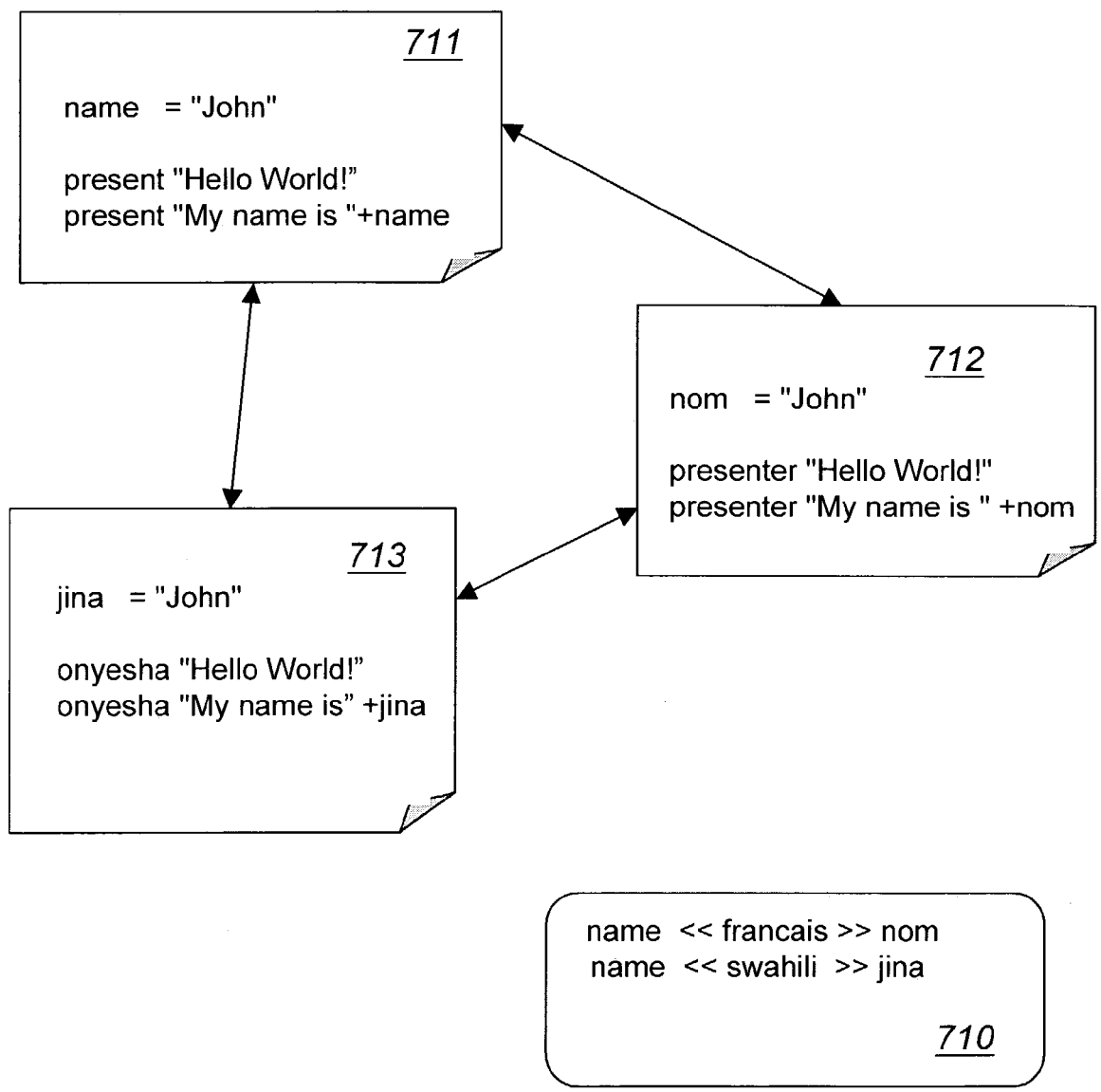
FIG. 11A is a block diagram of the programming example of FIG. 10 using the Remi multi-lingual programming system in three different languages.

Referring to FIG. 11A, the above problem is coded in English, or French, or Swahili, using Remi as shown in 711, or 712 or 713, respectively. Remi programs embody intended objectives captured as a sequence of tasks, and therefore a Remi script is a textual projection of that sequence of tasks. In fact, a Remi program has a plurality of instances (isoforms), each instance being a textual projection in a textual language of choice. With the Remi 'dictionary' shown in 710, then:

- the existence of any one of 711, 712 or 712 implies the existence of all three forms
- the execution of a Remi Application coded according to any one of 711, 712 or 712 implicitly executes all three forms.
- changes made to any one of 711, 712 or 712 imply mirrored changes to all three forms.

Figure 11B:
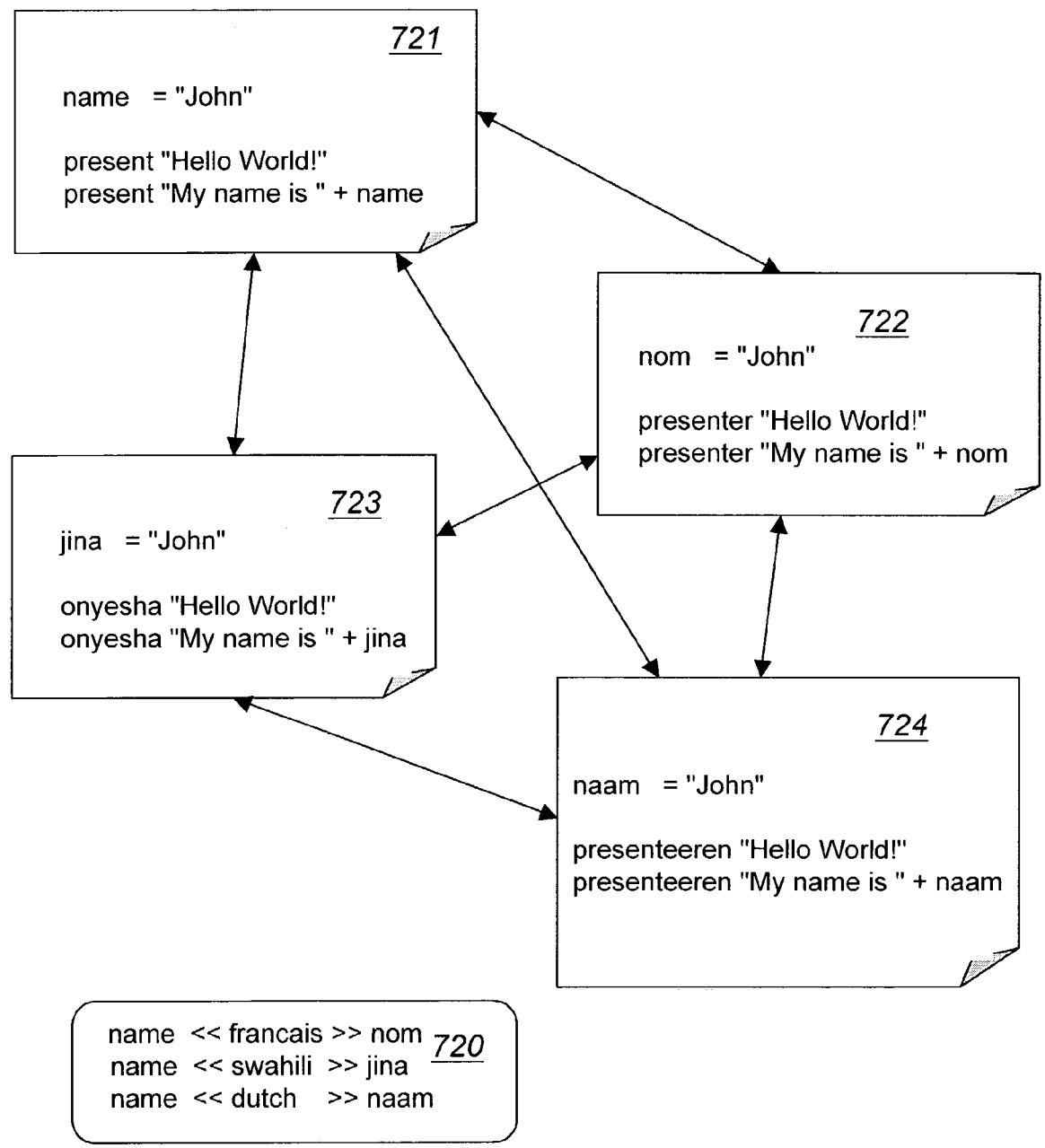
FIG. 11B is a block diagram of the example in FIG. 11A using four different languages.

In FIG. 11B, a new language i.e., Dutch is added as shown by the new 'dictionary' of 720. The simple change of 720 alone results in 4 'isoforms' (721, 722, 723 and 724) of the Remi program.

Figure 12:
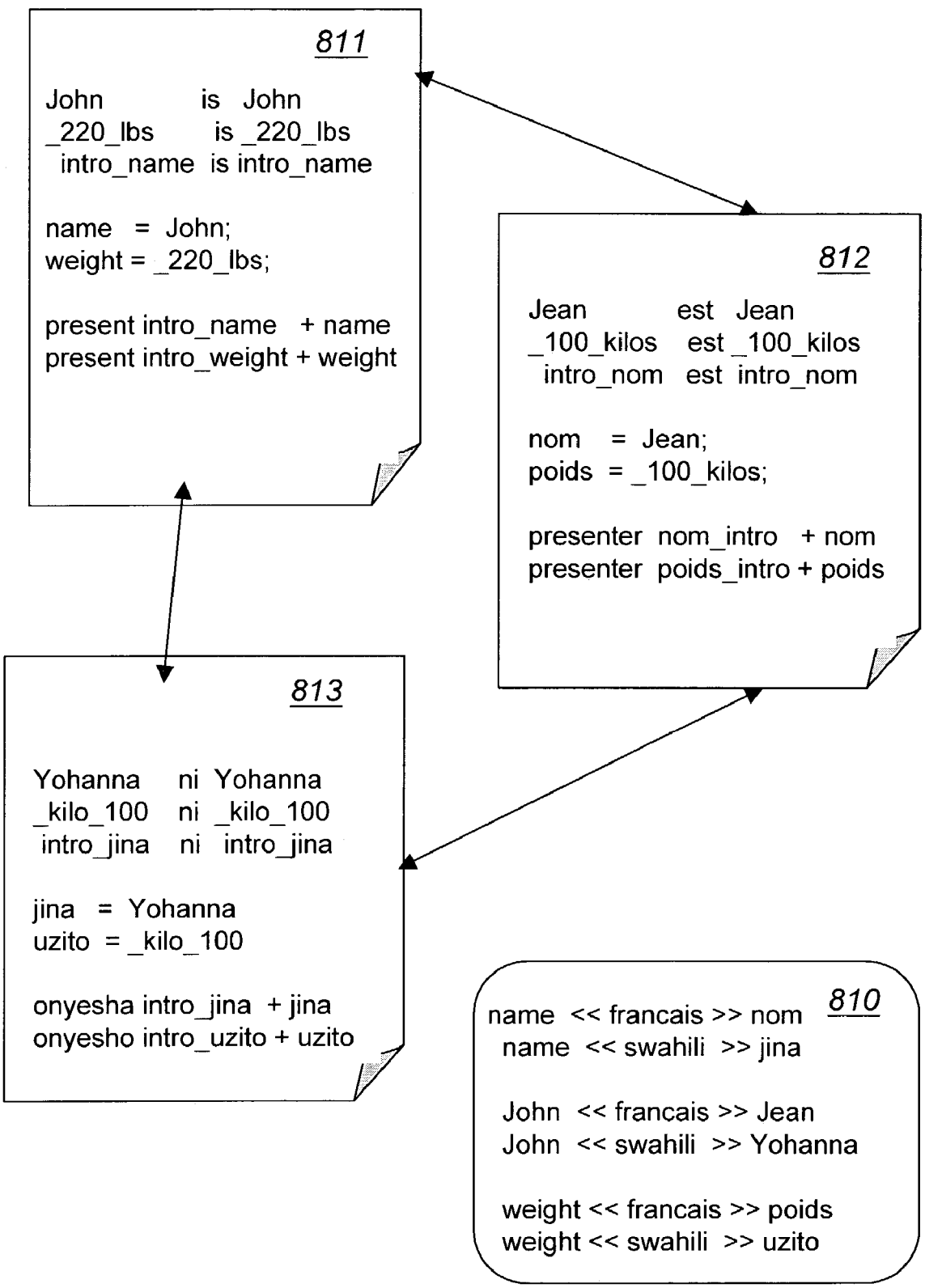
FIG. 12 is a block diagram of a programming example using the Remi multi-lingual programming system.

FIG. 12 shows how multilingual programming instructions can be used to simplify the creation of multilingual content and messages. Because a C++ program can only have a single instance, the same C++ program would include explicit statements to handle multilingual content for each language, reducing readability, and providing opportunities for programming errors. In contrast, Remi enables the programmer to write instructions as though there was a single language. If the programmer writes a Remi script in any one of 811, 812 or 813, and includes the dictionary shown in 810, then all 3 instances of 811, 812 and 813 are implied, and upon execution, all 3 instances will be executed, and the following multilingual forms of 2 messages will be created:

isoform 811 will create the messages
  'name is John'.
  'weight is _220_lbs'
isoform 812 will create the messages:
  'nom est Jean'.
  'oids est __100_kilos'
isoform 813 will create the messages:
  'Jina ni Yohanna'.
  'uzito ni _kilo__100'

Figure 13:
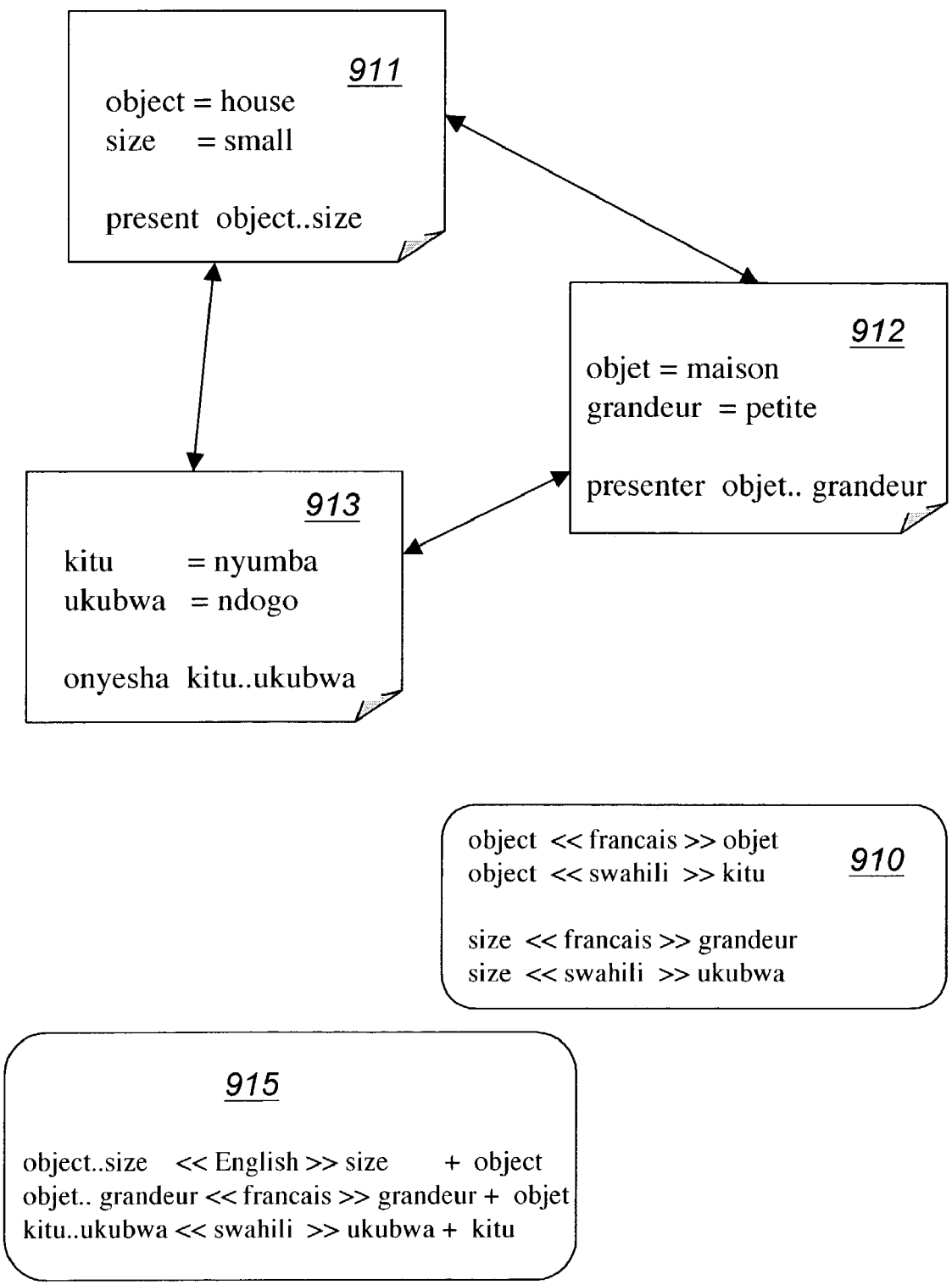
FIG. 13 is a block diagram of yet another programming example using the Remi multi-lingual programming system.

FIG. 13 shows the improved readability offered by Remi's multilingual programming instructions when expressing instructions to create multilingual messages and content that must respect differences in grammar between different languages. Thus, if the programmer writes a Remi script in any one of 911, 912 or 913 isoforms, and includes the dictionary shown in 910 and the 'grammar rules' shown in 915, then all 3 instances of 911, 912 and 913 are implied, and upon execution, all 3 instances will be executed, and the following multilingual forms of the messages will be created:

isoform 911 will create the messages 'small house'.
isoform 912 will create the messages 'petite maison'.
isoform 913 will create the messages 'nyumba ndogo'.

whereby the rules of grammar for Swahili required that the object i.e., nyumba precedes its adjective, i.e., ndogo' while in English and French it is more common for the adjective, i.e., small and petite to precede the object, i.e., house and maison.

Remi-Vu

RemiVu is a client application that enables one or more users to monitor the execution of a RemiApp in real-time. RemiVu displays each scripted Remi Task Line that is currently being executed by RemiExec, and highlights the specific Remi Task Action, RemiObject, operation operand or operation being actually executed. The displayed Remi Task Line can be viewed in any one of many languages defined for the RemiApp under execution. In one example, a RemiApp has four pre-defined languages, namely 'English', 'French', 'Swahili' and 'Remi'. 'Remi' is the language to be used to view the displayed Remi Task Line in the originally scripted form. In addition, in case an element of the displayed Remi Task Line has no translation in the selected language, RemiVu displays the element in its originally scripted form.

Figure 14A:
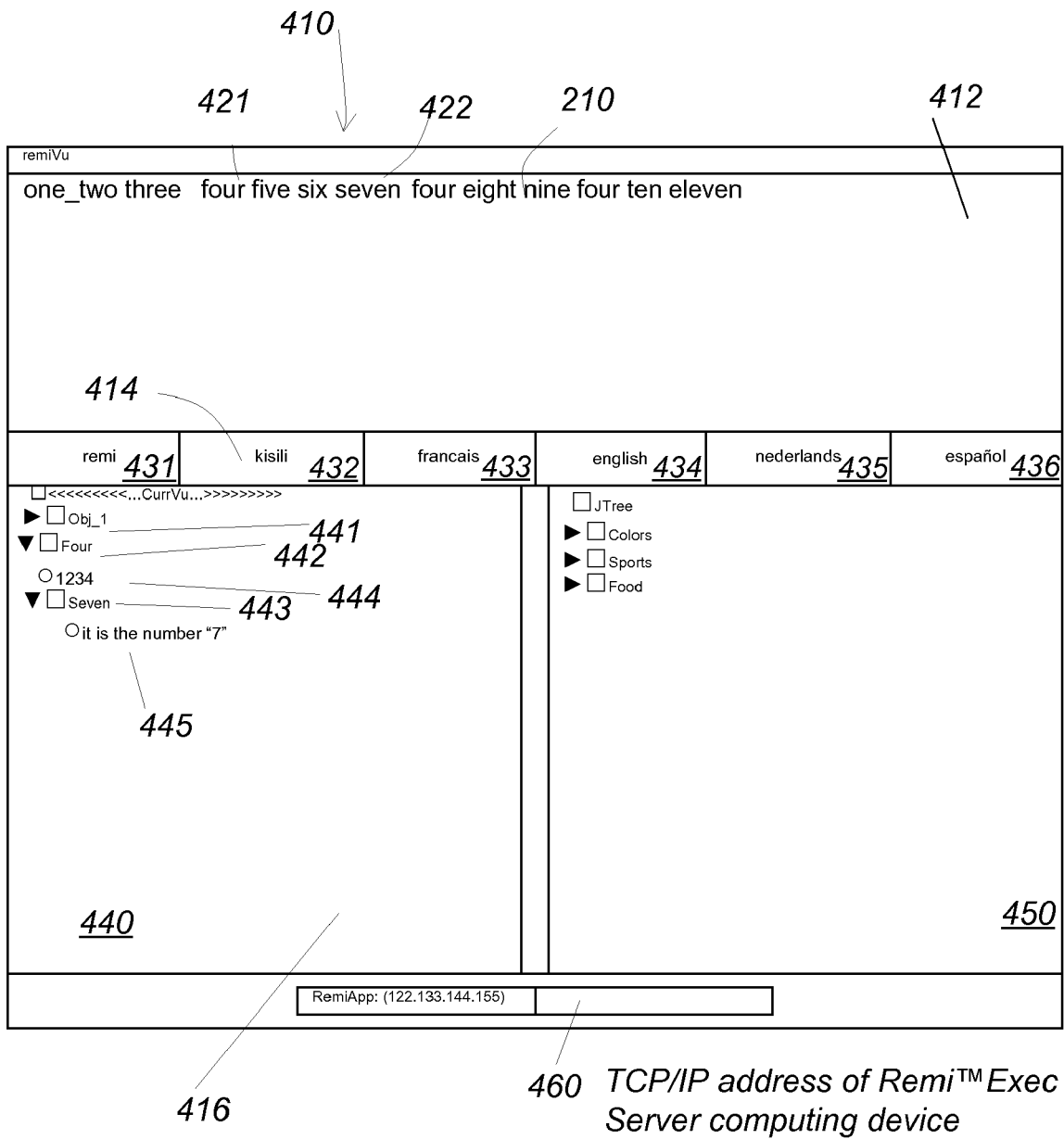
FIG. 14A and FIG. 14B are screen shots of the RemiVu software program.
Figure 14B:
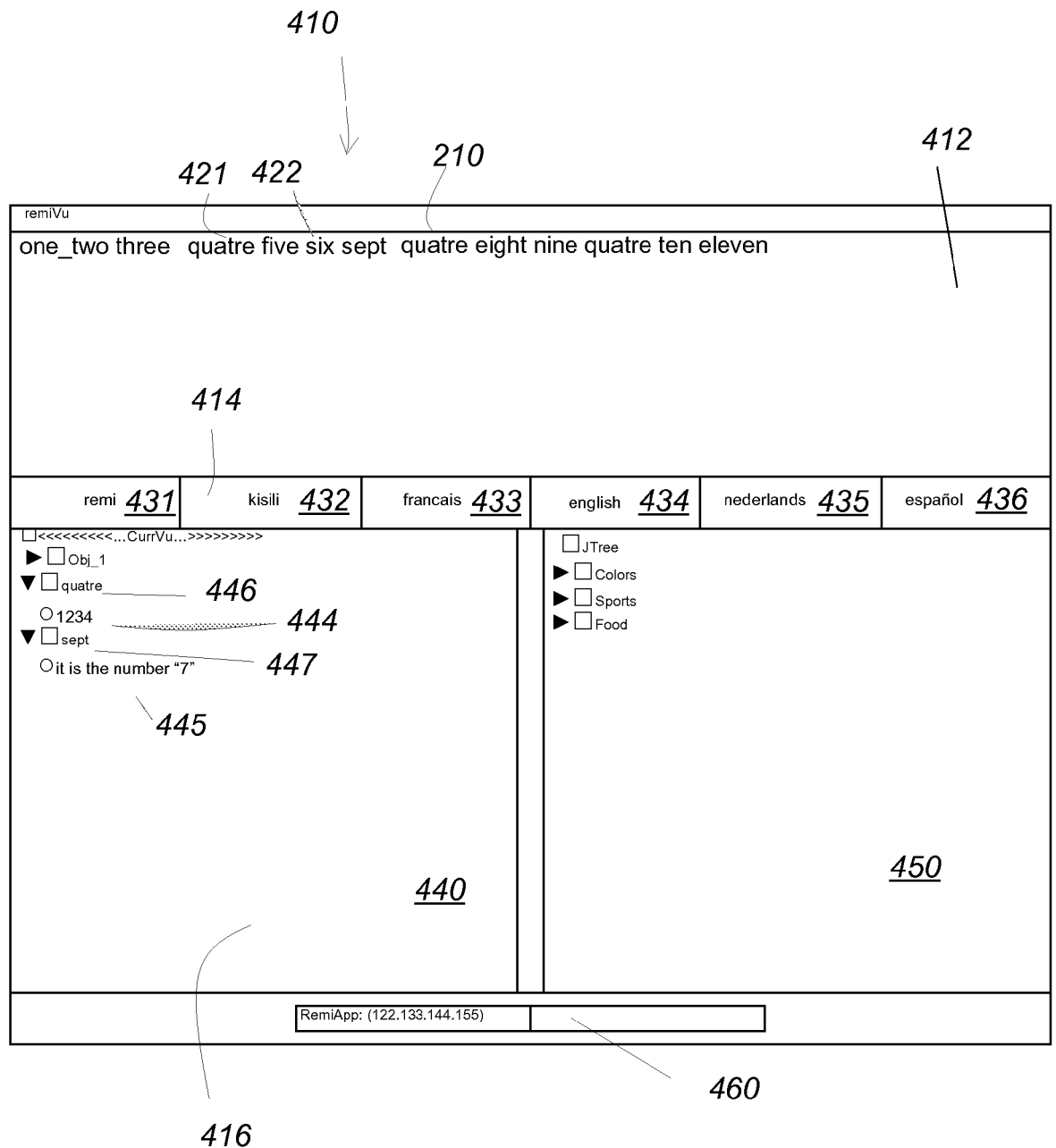

Referring to FIG. 14A and FIG. 14B a RemiVu screen shot 410 includes multilingual areas 412, 414, and 416. Multilingual area 412 depicts the translated Task Lines 210. In FIG. 14B, Task Lines "four" 421 and "seven" 422 are translated in French. Multilingual area 414 depicts the various languages that are supported by this particular version of the RemiApp software component. They include "Remi" 431, Swahili 432, French 433, English 434, Dutch 435, and Spanish 436. The names of each language are expressed in the corresponding language, i.e., Swahili is "kisili", French is "francais", Dutch is "nederlands", Spanish is "espaniol", and English is "english". In FIG. 14B where TaskLines 421 and 422 are depicted in French, the corresponding "francais" label 433 is highlighted. Multilingual area 416 includes areas 440 and 450. Area 440 depicts all objects 441, 442, and 443 and instantaneous values 444, 445 of objects 442, 443, respectively, that are present in the currently viewed Task Lines 421 and 422. The objects 442, 443 are depicted using translated identifiers. In FIG. 14B objects "four" 442, and "seven" 443 are depicted in French as "quatre" 446, and "sept" 447, respectively. Items 444 and 445 represent the instantaneous values of object 446 "quatre" and 447 "sept", respectively. Multilingual area 450 includes all the objects and their corresponding values that are not present in the current Task Line. The objects and their values are displayed using a collapsible and expandable tree format. Area 460 includes the Transmission Control Protocol/Internet Protocol (TCP/IP) address of the Computing Device that functions as the RemiExec server. Each RemiVu instance connects to the RemiApp via this dedicated TCP/IP connection. Thus, a RemiVu instance can monitor and view a RemiApp execution instance via the Internet. Furthermore, multiple users can all monitor and view the same instance of a RemiApp under execution in real-time. All users will have the same choice of languages for displaying the actual Remi Task Line, and RemiObject names. Each user can independently select the specific language for his particular view. Thus a RemiScript written in English, French and Swahili can be viewed in real-time by many users around the globe, whereby some users monitor the execution in English, some in French, and others in Swahili. Each user can also switch to any other language at any time. Establishing a connection from a RemiVu client to a RemiExec server requires the user to enter the server's TCP/IP address at the RemiVu client. Security and authentication is enforced by the RemiExec server component. In order to ensure timely execution of RemiApp without being affected by number of users, or reliability of connections, RemiApp exec establishes each connection using a separate lower priority thread for each connection.

List of Remi Syntax

Table 21 specifies the syntax for Remi objects, task actions, and object properties.

TABLE 21

| | | |
|---|---|---|
| RemiScript | := | [ [ RemiTaskLine ] [ RemiServiceDefn ] [ RemiLangDefn ] [ BlankLine ] [CommentLine ] ] |
| RemiTaskLine | := | ConstrainedTaskLine \| BasicTaskLine |
| BasicTaskLine | := | ObjectiveTaskLine |
| ConstrainedTaskLine | := | ObjectiveTaskLine ConstraintTaskLine [ ConstraintTaskLine ] |
| ObjectiveTaskLine | := | RemiTask [ TaskObject ] \| [ RemiTask [ TaskObject ] ] |
| ConstraintTaskLine | := | ConstraintOperator actionTEST AntiTaskLine \| [ ConstraintOperator actionTEST AntiTaskLine] |
| AntiTaskLine | := | AntiRemiTask [ TaskObject ] \| [AntiRemiTask [ TaskObject ] ] |
| RemiTask | := | actionFIND \| actionKEEP \| actionSERVE \| actionEXHIBIT \|actionFINISH \|actionTEST \| ArithmeticTask \| UserDefinedTask |
| AntiRemiTask | := | antiFIND\|antiKEEP\|antiSERVE\|antiEXHIBIT |
| actionFIND | := | 'find' \| 'chercher' \| 'tafuta' \| 'vinden' [ userDefinedFIND] |
| actionKEEP | := | 'remember'\| 'retenir' \| 'kumbuka' \| 'aanhouden' [ userDefinedKEEP] |
| actionSERVE | := | 'serve'\|'servir'\|  'hudumia\| 'aadienen' \| [ userDefinedSERVE] |
| actionEXHIBIT | := | 'present'\|'presenter'\| 'onyesha'   \| 'presenteeren' \| [ userDefinedEXHIBIT] |
| actionFINISH | := | 'end' \|'finir' \|  'mwisho'   \| 'beeinden'\| [ userDefinedFINISH] |
| antiFIND | := | 'find_not' \| 'chercher_pas' \| 'usitafute' \| 'vinden_niet'\| [ userAntiFIND] |
| antiKEEP | := | 'remember_not'\| 'retenir_pas' \| 'usikumbuke' \| 'aanhouden_niet'\|[ userAntiKEEP] |
| antiSERVE | := | 'serve_not'\| 'servir_pas'\|   'usihudumie'\| 'aadienen_niet' \| [ userAntiSERVE] |
| antiEXHIBIT | := | 'present_not' \| 'presenter_pas'\|'usionyeshe' \| \|'presenteeren_niet' \| [ userAntiEXHIBIT] |
| userDefinedFIND | := | UserObjectString |
| userDefinedKEEP | := | UserObjectString |
| userDefinedSERVE | := | UserObjectString |
| userDefinedEXHIBIT | := | UserObjectString |
| userDefinedFINISH | := | UserObjectString |
| actionTEST | := | LogicalTEST \| IntegrityTEST |
| LogicalTEST arithStatement | := | OpenTestOperator arithStatement comparisonOperator CloseTestOperator ExecTestOperator |
| IntegrityTEST ExecTestOperator | := | OpenTestOperator TaskObject CloseTestOperator |
| TaskObject | := | ObjectEXHIBITION \| objectSERVICE \| objectRECALL \| UserObject |
| ObjectEXHIBITION | := | 'exhibition' \| 'exhibition'   \| 'onyesho' \| 'presentatie' [ userDefinedEXHIBITION] |
| objectSERVICE | := | 'service' \| 'service'\| 'huduma' \| 'dienst' [ userDefinedSERVICE] |
| objectRECALL | := | 'recall' \| 'retenir' \| 'kumbuko' \| 'aanhouden' [userDefinedRECALL] |
| userdEXHIBITION | := | UserObjectString |
| userSERVICE | := | UserObjectString |
| userRECALL | := | UserObjectString |
| UserObject | := | UserObjectString |
| RemiConjunction | := | conjuctionWHAT \| conjuctionPLURALITY \| conjuctionBY |
| conjuctionWHAT | := | 'is' \| 'est'\| 'ni' \| 'is' \| [ userDefinedWHAT] |
| conjuctionPLURALITY | := | 'and' \| 'et' \| 'na' 'en' \| [ userDefinedPLURALITY] |
| conjuctionBY | := | 'by'\| 'par' \| 'kwa' \| 'door' \| [ userDefinedBY] |
| userDefinedWHAT | := | UserObjectString |
| userDefinedPLURALITY | := | UserObjectString |
| UserDefinedBY | := | UserObjectString |
| UserObjectString | := | charAlphabet \| charUnderLine [ charAlphabet \| charUnderLine \| charDigit ] |
| GeneralString | := | charAlphabet \| charUnderLine [ charAlphabet \| charUnderLine \| charDigit ] |
| charAlphabet | := | 'a' \| 'b' \| 'c' \| 'd' \| 'e' \| 'f' \| 'g' \| 'h' \| 'i' \| 'j' \| 'k' \| 'l' \| 'm' \| 'n' \| 'o' \| 'p' \| 'q' \| 'r' \| 's' \| 't' \| 'u' \| 'v' \| 'w' \| 'x' \| 'y' \| 'z' \| 'A' \| 'B' \| 'C' \| 'D' \| 'E' \| 'F' \| 'G' \| 'H' \| 'I' \| 'J' \| 'K' \| 'L' \| 'M' \| 'N' \|'O' \| 'P' \| 'Q' \| 'R' \| 'S' \| 'T' \| 'U' \| 'V' \| 'W' \| 'X' \| 'Y' \| 'Z' |
| charDigit | := | '0' \| '1' \| '2' \| '3' \| '4' \| '5' \| '6' \| '7' \| '8' \| '9' |
| charUnderLine | := | '_' |
| ArithOperator | := | '+' \| '−' \| '*' \| '/' \| '^' |
| LogicalOperator | := | '<' \| '>' \| '= =' \| '<=' \| '>=' \| '=<' \| '=>' |
| UnaryOperator | := | '+' \| '−' |
| ReferenceOperator | := | '.' |

TABLE 21-continued

| | | |
|---|---|---|
| ConstraintOperator | := | '->' |
| FlowOperator | := | '->' |
| OpenTestOperator | := | '(' |
| CloseTestOperator | := | ')' |
| ExecTestOperator | := | '?' |
| MemberOperator | := | '.' |
| SwapOperator | := | '><' |
| OpenObjectOperator | := | '{' |
| CloseObjectOperator | := | '}' |
| OpenLangOper | := | '<<' |
| OpenLangOper | := | '>>' |
| CommentMarker | := | '//' |
| ContinuedMarker | := | '..' |
| BlankChar | := | ' ' \| <TAB> |
| UserObject | := | VariableObject \| ComplexObject \| ObjectProperty |
| ObjectProperty | := | ExtObjectProperty \| LocalObjectProperty |
| ExtObjectProperty | := | ComplexObject MemberOperator [ ComplexObject MemberOperator] |
| VariableObject | := | UserObjectString |
| ComplexObject | := | UserObjectString |
| LocalObjectProperty | := | ServiceProperty \| ValueProperty |
| ServiceProperty | := | ServiceProperty \| ValueProperty |
| ServiceProperty | := | UserObject \| AccessorService |
| ValueProperty | := | UserObject |
| ComplexObjectDefn | := | InherritedObjectDefn \| BaseObjectDefn |
| InherritedObjectDefn | := | UserObject [ ContinuationMarker UserObject ] BaseObjectDefn |
| BaseObjectDefn | := | OpenObjectOperator ObjectProperty [ ObjectProperty ] CloseObjectOperator |
| RemiLangDefn | := | UserObject OpenLangDefn UserLanguage CloseLangDefn UserObject |
| UserLanguage | := | UserObjectString |
| CommentLine | := | CommentMarker [ GeneralString ] |
| BlankLine | := | [ BlankChar ] |
| RemiService | := | ConditionalService \| UnCondService \| LoopService |
| ConditionalService | := | actionTEST [actionTEST] UnCondService |
| ConditionalServDefn | := | ConditionalServDefn \| UnCondServDefn |
| UnCondService | := | UnCondServDefn UnCondServBody actionFINISH |
| UnCondServDefn | := | objectSERVICE UserObject conjuctionWHAT [ ProjectionList] |
| UnCondServBody | := | [ RemiTaskLine ] |
| ProjectionList | := | [ContinuedMarker actionREMEMBER UserObject [UserObject] ] [ ContinuedMarker AntiREMEMBER UserObject [UserObject] ] |
| LoopService | := | LoopServDefn LoopServBody actionFINISH |
| LoopServDefn | := | userDefinedSERVE EndOfLaskLine |
| LoopServBody | := | [ RemiTaskLine ] actionTEST actionFINISH [ [ RemiTaskLine ] [actionTEST actionFINISH ] ] |

Several embodiments of the present invention have been described. Nevertheless, it will be understood that various modifications may be made without departing from the spirit and scope of the invention. Accordingly, other embodiments are within the scope of the following claims.

What is claimed is:

1. A computer programming system for scripting and executing an application program comprising:

a processor for executing said application program under the control of an operating system;

an object oriented programming language system comprising:

a scripting program for composing code written in a text file according to an object oriented programming grammar, said object oriented programming grammar comprising one or more task actions, one or more anti-task actions, wherein said one or more anti-task actions terminate said corresponding one or more task actions, one or more objects, and one or more object properties of each of said one or more objects;

a parser program for converting said code written in said text file into one or more executable task actions, one or more executable anti-task actions -and said one or more object properties of each of said one or more objects; and an execution engine for executing said one or more executable task actions and said one or more executable anti-task actions upon said one or more object properties of each of said one or more objects thereby generating an instance of said application program;

a viewing program for viewing instantaneous results and progress of said execution engine on said one or more executable task actions, said one or more executable anti-task actions and said one or more object properties of each of said one or more objects; and a memory associated with said processor wherein- said operating system, said object oriented programming language system, said viewing program and said instance of said application program are stored.

2. The computer programming system of claim 1 wherein said object oriented programming grammar comprises at least five predefined task actions, said task actions comprising "remember" for granting a lasting effect of a task action, "find" for performing a search, "present" for creating an output file, "serve" for executing a specialized service, and "end" for terminating a service.

3. The computer programming system of claim 2 wherein said object oriented programming grammar further comprises at least four predefined anti-task actions, said anti-task actions comprising "remember-not", "find-not", "present-not", and "serve-not", and wherein said anti-task actions terminate said corresponding task actions.

4. The computer programming system of claim 1 wherein said object oriented programming grammar comprises at least six predefined objects, said objects comprising "service" referencing a specialized set of task actions, "variable" representing a value, "class" representing a set of properties and services encapsulated by an object, "operator" referencing a resulting outcome of a set of task actions and operations, "label" referencing a character string of an object name, and "exhibit" referencing an object used to create an output file.

5. The computer programming system of claim 1 wherein said object oriented programming grammar comprises at least one predefined assertion instruction, said assertion instruction comprising "is".

6. The computer programming system of claim 1 wherein said object oriented programming grammar comprises at least two conjunctive keywords, said conjunctive keywords comprising "by" and "with".

7. The computer programming system of claim 1 wherein said object oriented programming grammar comprises:
   at least five predefined task actions, said task actions comprising "remember" for granting a lasting effect of a task action, "find" for performing a search, "present" for creating an output file, "serve" for executing a specialized service, and "end" for terminating a service;
   at least four predefined anti-task actions, said anti-task actions comprising "remember-not", "find-not", "present-not", and "serve-not", and wherein said anti-task actions terminate said corresponding task actions;
   at least six predefined objects, said objects comprising "service" referencing a specialized set of task actions, "variable" representing a value, "class" representing a set of properties and services encapsulated by an object, "operator" referencing a resulting outcome of a set of task actions and operations, "label" referencing a character string of an object name, and "exhibit" referencing an object used to create an output file;
   at least one predefined assertion instruction, said assertion instruction comprising "is"; and
   at least two conjunctive keywords, said conjunctive keywords comprising "by" and "with".

8. The computer programming system of claim 7 wherein said object oriented programming grammar further comprises one or more translations of said task actions, said anti-task actions, said objects, said assertion instruction and said conjunctive keywords, in one or more human or non-human languages, respectively.

9. The computer programming system of claim 8 wherein said object oriented programming grammar further comprises one or more translations of user-defined task actions, user-defined objects, user-defined object properties, and user defined operators in one or more human or non-human languages, respectively.

10. The computer programming system of claim 8 wherein said one or more human languages are selected from a group consisting of English, French, Swahili, Dutch, German, Spanish, and Italian.

11. The computer programming system of claim 8 wherein said text file is adapted to be scripted using any combination of said one or more translations of said task actions, said anti-task actions, said objects, said assertion instruction and said conjunctive keywords.

12. The computer programming system of claim 8 wherein said a parser program converts said code written in said text file into one or more executable task actions and into said one or more object properties, and wherein each of said executable task actions and each of said object properties is translated into said one or more translations of said one or more task actions, objects, and object properties, in said one or more human or non-human languages, respectively.

13. The computer programming system of claim 12 wherein said execution engine executes concurrently said one or more executable task actions upon said one or more object properties of said one or more objects, and said one or more translations of each of said one or more executable task actions upon all translations of said one or more object properties and for all translations of said one or more objects, thereby generating one or more instances of said application program translated in said one or more human or non-human languages, respectively.

14. The computer programming system of claim 13 wherein said viewing program comprises one or more visual textual displays, wherein said one or more visual textual displays display said one or more translations of said executable task actions, said objects and said object properties in said one or more human or non-human languages, respectively.

15. The computer programming system of claim 14 wherein said one or more visual textual displays are adapted to be viewed simultaneously and in real-time by one or more viewers in said one or more human or non-human languages, respectively.

16. The computer programming system of claim 8 wherein said one or more human languages are selected from a group consisting of machine languages and other object oriented programming languages.

17. The computer programming system of claim 1 wherein said object oriented programming grammar comprises one or more user-defined task actions.

18. The computer programming system of claim 17 wherein said object oriented programming grammar further comprises one or more user-defined anti-task actions, said user-defined anti-task actions terminating corresponding user-defined task actions.

19. The computer programming system of claim 1 wherein said object oriented programming grammar further comprises one or more user-defined objects.

20. The computer programming system of claim 19 wherein said object oriented programming grammar further comprises one or more user-defined object properties.

21. The computer programming system of claim 1 wherein said object oriented programming grammar further comprises one or more constraints and invariants associated with each of said one or more task actions and adapted to be applied to each of said one or more task actions.

22. The computer programming system of claim 21 wherein said execution engine executes and applies said one or more constraints and invariants to each of said one or more task actions.

23. The computer programming system of claim 1 wherein said object oriented programming grammar further comprises one or more object property constraints and integrity checking services associated with each of said one or more object properties of each of said one or more objects and adapted to be applied to each of said one or more object properties of each of said one or more objects.

24. The computer programming system of claim 23 wherein said execution engine executes and applies said one or more object property constraints and integrity checking services to each of said one or more object properties of each of said one or more objects.

25. The computer programming system of claim 1 wherein said object oriented programming grammar further comprises one or more object structural constraints and integrity checking services associated with each of said one or more object properties of each of said objects and adapted to be applied to each of said one or more object properties of each of said objects.

26. The computer programming system of claim 25 wherein said execution engine executes and applies said one or more object structural constraints and integrity checking services to each of said one or more object properties of each of said objects.

27. The computer programming system of claim 25 wherein said one or more structural constraints and integrity services associated with each of said one or more object properties of each of said objects comprises setting one or more property values for each of said one or more object properties of each of said objects.

28. The computer programming system of claim 25 wherein said one or more structural constraints and integrity services associated with each of said one or more object properties of each of said objects comprises setting one or more constants for each of said one or more object properties of each of said objects.

29. The computer programming system of claim 25 wherein said one or more structural constraints and integrity service associated with each of said one or more object properties of each of said objects comprises setting one or more property services for each of said one or more object properties of each of said objects.

30. The computer programming system of claim 1 wherein said object oriented programming grammar further comprises one or more environmental constraints and integrity checking services associated with each of said one or more object properties of each of said objects and adapted to be applied to each of said one or more object properties of each of said objects.

31. The computer programming system of claim 30 wherein said one or more environmental constraints and integrity checking services comprises setting one or more external objects.

32. The computer programming system of claim 30 wherein said one or more environmental constraints and integrity checking services comprises setting one or more external object properties.

33. The computer programming system of claim 30 wherein said execution engine executes and applies said one or more environmental constraints and integrity checking services to each of said one or more object properties of each of said objects.

34. The computer programming system of claim 1 wherein said object oriented programming grammar comprises:
one or more object property constraints and integrity checking services associated with each of said one or more object properties of each of said one or more objects and adapted to be applied to each of said one or more object properties of each of said one or more objects;
one or more object structural constraints and integrity checking services associated with each of said one or more object properties of each of said objects and adapted to be applied to each of said one or more object properties of each of said objects; and
one or more environmental constraints and integrity checking services associated with each of said one or more object properties of each of said objects and adapted to be applied to each of said one or more object properties of each of said objects.

35. The computer programming system of claim 34 wherein said execution engine executes and applies synergistically said one or more property constraints and integrity checking services, said one or more structural constraints and integrity checking services, and said one or more environmental constraints and integrity checking services to each of said one or more object properties.

36. The computer programming system of claim 34 wherein said object oriented programming grammar further comprises one or more constraints and invariants associated with each of said one or more task actions and adapted to be applied to each of said one or more task actions.

37. The computer programming system of claim 36 wherein said execution engine executes and applies synergistically said one or more constraints and invariants associated with each of said one or more task actions, said one or more property constraints and integrity checking services, said one or more structural constraints and integrity checking services, and said one or more environmental constraints and integrity checking services to each of said one or more object properties.

38. The computer programming system of claim 1 wherein said object oriented programming grammar further comprises any of task actions, objects, and object properties, listed in Table 21.

39. The computer programming system of claim 1 wherein said object oriented programming grammar comprises one or more attempted assignments and one or more mandatory assignments for each said object and each said object property, and wherein said one or more attempted and mandatory assignments are adapted to be executed by said execution engine.

40. The computer programming system of claim 39 wherein said execution engine executes said one or more attempted and mandatory assignments for each said object and each said object property and further marks each of said successful assignments as successful assignments and each of said unsuccessful assignments as unsuccessful assignments.

41. The computer programming system of claim 1 wherein said execution engine executes and applies an integrity checking service to each said object and each said object property whenever each said object and each said object property are an operand.

42. The computer programming system of claim 1 wherein said one or more object properties comprise value-centric properties selected from a group consisting of numerical values, alphanumerical values and combinations thereof.

43. The computer programming system of claim 1 wherein said one or more object properties comprise service-centric properties selected from a group consisting of a service, a constraint and an invariant.

44. The computer programming system of claim 1 wherein said object oriented programming grammar further comprises one or more user-defined operators, wherein said user-defined operators are selected from a group consisting of unary left-associated operators, unary right-associated operators, and alphanumerical binary operators.

45. The computer programming system of claim 1 wherein said object oriented programming grammar further comprises one or more operators wherein said operators are selected from a group consisting of unary left-associated operators, unary right-associated operators, and binary operators.

46. The computer programming system of claim 1 wherein said object oriented programming grammar further comprises one or more operators and one or more user-defined operators.

47. The computer programming system of claim 1 wherein said viewing program comprises a visual textual display, said visual textual display displaying said executable task actions, said object properties and said objects.

48. The computer programming system of claim 1 wherein said viewing program comprises one or more visual textual displays and wherein said one or more visual textual displays are adapted to be viewed simultaneously and in real-time by one or more viewers, and wherein said one or more viewers are located in one or more separated locations, respectively, and access a server hosting said computer programming system via a network connection.

49. A computer programming method for scripting and executing an application program comprising:
  formulating a problem statement;
  converting said problem statement into one or more steps that create and manipulate one or more objects;
  scripting said one or more steps into a collection of one or more textual instructions according to an object oriented programming grammar said object oriented grammar comprising one or more task actions, one or more anti-task actions, wherein said one or more anti-task actions terminate said corresponding one or more task actions, one or more objects, and one or more object properties for each of said one or more objects;
  parsing said collections of one or more textual instructions into one or more executable task actions, one or more executable anti-task actions and said one or more object properties of each of said one or more objects; and
  executing said one or more executable task actions and said one or more executable anti-task actions upon said one or more objects thereby producing an instance of said application program.

50. The computer programming method of claim 49 further comprising viewing instantaneous results and progress of said executing of said one or more executable task actions and said one or more executable anti-task actions upon said one or more objects.

51. The computer programming method of claim 50 wherein said viewing comprises viewing a visual textual display said display displaying said one or more executable task actions, said object properties and said objects.

52. The computer programming method of claim 50 wherein said viewing comprises viewing one or more visual textual displays and wherein said one or more visual textual displays are adapted to be viewed simultaneously and in real-time by one or more viewers, and wherein said one or more viewers are located in one or more separated locations, respectively, and access a server hosting said computer programming system via a network connection.

53. The computer programming method of claim 49 wherein said object oriented programming grammar comprises at least five predefined task actions, said task actions comprising "remember" for granting a lasting effect of a task action, "find" for performing a search, "present" for creating an output file, "serve" for executing a specialized service, and "end" for terminating a service.

54. The computer programming method of claim 53 wherein said object oriented programming grammar further comprises at least four predefined anti-task actions, said anti-task actions comprising "remember-not", "find-not", "present-not", and "serve-not", and wherein said anti-task actions terminate said corresponding task actions.

55. The computer programming method of claim 49 wherein said object oriented programming grammar comprises at least six predefined objects, said objects comprising "service" referencing a specialized set of task actions, "variable" representing a value, "class" representing a set of properties and services encapsulated by an object, "operator" referencing a resulting outcome of a set of task actions and operations, "label" referencing a character string of an object name, and "exhibit" referencing an object used to create an output file.

56. The computer programming method of claim 49 wherein said object oriented programming grammar comprises at least one predefined assertion instruction, said assertion instruction comprising "is".

57. The computer programming method of claim 49 wherein said object oriented programming grammar comprises at least two conjunctive keywords, said conjunctive keywords comprising "by" and "with".

58. The computer programming method of claim 49 wherein said object oriented programming grammar comprises:
  at least five predefined task actions, said task actions comprising "remember" for granting a lasting effect of a task action, "find" for performing a search, "present" for creating an output file, "serve" for executing a specialized service, and "end" for terminating a service;
  at least four predefined anti-task actions, said anti-task actions comprising "remember-not", "find-not", "present-not", and "serve-not", and wherein said anti-task actions terminate said corresponding task actions;
  at least six predefined object types, said object types comprising "service" referencing a specialized set of task actions, "variable" representing a value, "class" representing a set of properties and services encapsulated by an object, "operator" referencing a resulting outcome of a set of task actions and operations, "label" referencing a character string of an object name, and "exhibit" referencing an object used to create an output file;
  at least one predefined assertion instruction, said assertion instruction comprising "is"; and
  at least two conjunctive keywords, said conjunctive keywords comprising "by" and "with".

59. The computer programming method of claim 58 wherein said object oriented programming grammar further comprises one or more user-defined operators, wherein said user-defined operators are selected from a group consisting of unary left-associated operators, unary right-associated operators, and alphanumerical binary operators.

60. The computer programming method of claim 58 wherein said object oriented programming grammar further comprises one or more operators wherein said operators are selected from a group consisting of unary left-associated operators, unary right-associated operators, and binary operators.

61. The computer programming method of claim 58 wherein said object oriented programming grammar further comprises one or more operators and one or more user-defined operators.

62. The computer programming method of claim 58 wherein said object oriented programming grammar further comprises one or more translations for each of said task actions, said anti-task actions, said objects, said assertion instruction and said conjunctive keywords, in one or more human or non-human languages, respectively.

63. The computer programming method of claim 62 wherein said object oriented programming grammar further comprises one or more translations of user-defined task actions, user-defined objects, user-defined object properties, and user defined operators in one or more human or non-human languages, respectively.

64. The computer programming method of claim 63 wherein said scripting comprises using any combination of said one or more translations for each of said task actions, said anti-task actions, said objects, said assertion instruction and said conjunctive keywords.

65. The computer programming method of claim 64 wherein said scripting further comprises using any combination of said one or more translations for each of said user-defined task actions, said user-defined anti-task actions, said user-defined objects, and said user-defined object properties.

66. The computer programming method of claim 62 wherein said one or more human languages are selected from a group consisting of English, French, Swahili, Dutch, German, Spanish, and Italian.

67. The computer programming method of claim 62 wherein said parsing converts said code written in said text file into one or more executable task actions and into said one or more object properties, and wherein each of said executable task actions and each of said object properties is translated into said one or more translations of said one or more task actions, objects, and object properties, in said one or more human or non-human languages, respectively.

68. The computer programming method of claim 67 wherein said executing comprises executing concurrently all translations of each of said one or more executable task actions upon all translations of said one or more object properties and for all translations of said one or more objects, thereby generating one or more instances of said application program translated in said one or more human or non-human languages, respectively.

69. The computer programming method of claim 68 wherein said viewing comprises viewing one or more visual textual displays, wherein said one or more visual textual displays display said one or more translations of said executable task actions, said objects and said object properties in said one or more human or non-human languages, respectively.

70. The computer programming method of claim 69 wherein said one or more visual textual displays are adapted to be viewed simultaneously and in real-time by one or more viewers in said one or more human or non-human languages, respectively.

71. The computer programming method of claim 62 wherein said one or more non-human languages are selected from a group consisting of machine languages, and other object oriented programming languages.

72. The computer programming method of claim 49 wherein said object oriented programming grammar further comprises one or more user-defined task actions.

73. The computer programming method of claim 72 wherein said object oriented programming grammar further comprises one or more user-defined anti-task actions, said user-defined anti-task actions terminating corresponding user-defined task actions.

74. The computer programming method of claim 49 wherein said object oriented programming grammar further comprises one or more user-defined objects.

75. The computer programming method of claim 49 wherein said object oriented programming grammar further comprises one or more user-defined object properties.

76. The computer programming method of claim 49 wherein said object oriented programming grammar comprises one or more constraints and invariants associated with each of said one or more task actions and adapted to be applied to each of said one or more task actions.

77. The computer programming method of claim 76 wherein said executing of said executable one or more task actions upon said one or more objects further comprises executing and applying said one or more constraints and invariants to each of said one or more task actions.

78. The computer programming method of claim 49 wherein said object oriented programming grammar further comprises one or more object property constraints and integrity checking services associated with each of said one or more object properties of each of said one or more objects and adapted to be applied to each of said one or more properties of each of said one or more objects.

79. The computer programming method of claim 78 wherein said executing of said executable one or more task actions upon said one or more objects further comprises executing and applying said one or more object property constraints and integrity checking services to each of said one or more object properties of each of said one or more objects.

80. The computer programming method of claim 49 wherein said object oriented programming grammar further comprises one or more object structural constraints and integrity checking services associated with each of said one or more object properties of each of said one or more objects and adapted to be applied to each of said one or more object properties of each of said one or more objects.

81. The computer programming method of claim 80 wherein said executing of said executable one or more task actions upon said one or more objects further comprises executing and applying said one or more object structural constraints and integrity checking services to each of said one or more object properties of each of said one or more objects.

82. The computer programming method of claim 81 wherein said one or more structural constraints and integrity services associated with each of said one or more object properties of each of said one or more objects comprise setting one or more property values for each of said one or more object properties of each of said one or more objects.

83. The computer programming method of claim 81 wherein said one or more structural constraints and integrity services associated with each of said one or more object properties of each of said one or more objects comprise setting one or more constants for each of said one or more object properties of each of said one or more objects.

84. The computer programming method of claim 81 wherein said one or more structural constraints and integrity service associated with each of said one or more object properties of each of said one or more objects comprise setting one or more property services for each of said one or more object properties of each of said one or more objects.

85. The computer programming method of claim 49 wherein said object oriented programming grammar further comprises one or more environmental constraints and integrity checking services associated with each of said one or more object properties of each of said one or more objects and adapted to be applied to each of said one or more object properties of each of said one or more objects.

86. The computer programming method of claim 85 wherein said one or more environmental constraints and integrity checking services comprise setting one or more external objects.

87. The computer programming method of claim 85 wherein said one or more environmental constraints and integrity checking services comprise setting one or more external object properties.

88. The computer programming method of claim 85 wherein said executing of said executable one or more task actions upon said one or more objects further comprises executing and applying said one or more environmental constraints and integrity checking services to each of said one or more object properties of each of said one or more objects.

89. The computer programming method of claim 49 wherein said object oriented programming grammar comprises:
one or more object property constraints and integrity checking services associated with each of said one or more object properties of each of said one or more objects and adapted to be applied to each of said one or more object properties of each of said one or more objects;
one or more object structural constraints and integrity checking services associated with each of said one or more object properties of each of said one or more objects and adapted to be applied to each of said one or more object properties of each of said one or more objects; and
one or more environmental constraints and integrity checking services associated with each of said one or more object properties of each of said one or more objects and adapted to be applied to each of said one or more object properties of each of said one or more objects.

90. The computer programming method of claim 89 wherein said executing of said executable one or more task actions upon said one or more objects further comprises executing and applying synergistically said one or more property constraints and integrity checking services, said one or more structural constraints and integrity checking services, and said one or more environmental constraints and integrity checking services to each of said one or more object properties of each of said one or more objects.

91. The computer programming method of claim 89 wherein said object oriented programming grammar further comprises one or more constraints and invariants associated with each of said one or more task actions and adapted to be applied to each of said one or more task actions.

92. The computer programming method of claim 91 wherein said executing of said executable one or more task actions upon said one or more objects further comprises executing and applying synergistically said one or more constraints and invariants associated with each of said one or more task actions, said one or more property constraints and integrity checking services, said one or more structural constraints and integrity checking services, and said one or more environmental constraints and integrity checking services to each of said one or more object properties of each of said one or more objects.

93. The computer programming method of claim 49 wherein said object oriented programming grammar further comprises any of task actions, objects, and object properties, listed in Table 21.

94. The computer programming method of claim 49 wherein said object oriented programming grammar comprises one or more attempted assignments and one or more mandatory assignments for each object and object property.

95. The computer programming method of claim 94 wherein said executing of said executable one or more task actions upon said one or more objects further comprises executing said one or more attempted or mandatory assignments for each object and object property and further marking each of said successful assignments as successful assignments and each of said unsuccessful assignments as unsuccessful assignments.

96. The computer programming method of claim 49 wherein said executing of said executable one or more task actions upon said one or more objects further comprises executing and applying an integrity checking service to each object and object property whenever said object, variable and object property are an operand.

97. The computer programming method of claim 49 wherein said one or more object properties comprise value-centric properties selected from a group consisting of numerical values, alphanumerical values and combinations thereof.

98. The computer programming method of claim 49 wherein said one or more object properties comprise service-centric properties selected from a group consisting of a service, a constraint and an invariant.

* * * * *